(12) United States Patent
Shpurov et al.

(10) Patent No.: US 10,764,039 B2
(45) Date of Patent: Sep. 1, 2020

(54) DYNAMIC GENERATION AND MANAGEMENT OF ASYMMETRIC CRYPTOGRAPHIC KEYS USING DISTRIBUTED LEDGERS

(71) Applicant: The Toronto-Dominion Bank, Toronto (CA)

(72) Inventors: Alexey Shpurov, Toronto (CA); Helena Litani, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 211 days.

(21) Appl. No.: 16/052,162

(22) Filed: Aug. 1, 2018

(65) Prior Publication Data
US 2020/0044833 A1 Feb. 6, 2020

(51) Int. Cl.
H04L 9/08 (2006.01)
H04L 29/06 (2006.01)
G06F 21/62 (2013.01)

(52) U.S. Cl.
CPC ........ *H04L 9/0825* (2013.01); *G06F 21/6227* (2013.01); *H04L 9/0861* (2013.01); *H04L 9/0894* (2013.01); *H04L 63/0442* (2013.01)

(58) Field of Classification Search
CPC . H04L 9/0825; H04L 63/0442; H04L 9/0861; H04L 9/0891; H04L 9/0836; G06F 21/6227
See application file for complete search history.

(56) References Cited

U.S. PATENT DOCUMENTS 9,935,772 B1 * 4/2018 Madisetti .............. H04L 9/0819
2010/0246827 A1 * 9/2010 Lauter ................. G06F 21/6209
380/278

(Continued)

FOREIGN PATENT DOCUMENTS

EP 2953290 9/2015
EP 3185464 6/2017
WO WO 2017/145016 8/2017

OTHER PUBLICATIONS

Nunez et al., "An optimized blockchain solution for the IBM z14," IBM Journal of Research and Development, vol. 62, No. 2/3, Jan. 31, 2018 (16 pages).

(Continued)

*Primary Examiner* — Ali S Abyaneh
(74) *Attorney, Agent, or Firm* — Duane Morris LLP

(57) ABSTRACT

The disclosed exemplary embodiments include computer-implemented systems, apparatuses, and processes that dynamically generate and manage a distribution of asymmetric cryptographic keys using distributed ledgers. For example, an apparatus may extract, from a hierarchical data structure, an index value associated with a corresponding element of permissioning data. The apparatus may also extract, from a first element of a distributed ledger, cryptographic data that includes a first public cryptographic key associated with the hierarchical data structure. The apparatus may generate a second public cryptographic key based on the first public cryptographic key and the extracted index value, and encrypt information using the second public cryptographic key. The encrypted information may be associated with the corresponding element of permissioning data, and the second public cryptographic key may be discarded in response to the encryption of the information.

18 Claims, 10 Drawing Sheets

(56) References Cited

U.S. PATENT DOCUMENTS

| | | |
|---|---|---|
| 2017/0041296 A1 | 2/2017 | Ford et al. |
| 2017/0207917 A1 | 7/2017 | Davis |
| 2017/0250972 A1 | 8/2017 | Ronda et al. |
| 2017/0316410 A1 | 11/2017 | Smith et al. |
| 2018/0019879 A1 | 1/2018 | Kravitz et al. |
| 2018/0019993 A1 | 1/2018 | Kravitz et al. |
| 2018/0096163 A1 | 4/2018 | Jacques de Kadt et al. |
| 2018/0097638 A1 | 4/2018 | Haldenby et al. |
| 2018/0097783 A1 | 4/2018 | Haldenby et al. |
| 2018/0130050 A1* | 5/2018 | Taylor .................. H04L 9/3247 |
| 2018/0288022 A1* | 10/2018 | Madisetti ................ G06F 21/33 |
| 2018/0349968 A1* | 12/2018 | O'Brien ................ H04L 9/3297 |
| 2019/0305943 A1* | 10/2019 | Hoersten .................. H04L 9/14 |

OTHER PUBLICATIONS

BIP-0032, retrieved from https://github.com/bitcoin/bips/blob/master/bip-0032.mediawiki#Specification_Key_derivation on Aug. 1, 2018 (10 pages).

* cited by examiner

DYNAMIC GENERATION AND MANAGEMENT OF ASYMMETRIC CRYPTOGRAPHIC KEYS USING DISTRIBUTED LEDGERS

TECHNICAL FIELD

The disclosed embodiments generally relate to computer-implemented systems and processes that, among other things, dynamically generate and manage a distribution of asymmetric cryptographic keys using distributed ledgers.

BACKGROUND

Today, hierarchically structured enterprises and organizations, such as financial institutions, corporations, and governments, can be characterized by geographically dispersed operational units, departments, and groups that generate and often share customer and business data. Given the sensitivity of this shared data, many hierarchically structured enterprises and organizations assign data access or modifications permissions to the computing systems and devices operating within the operational units, departments, and groups, and enforce the assigned permissions through selected encryption based on unit-, department-, and group-specific asymmetric cryptographic keys.

SUMMARY

In some examples, an apparatus includes a communications unit, a storage unit storing instructions, and at least one processor coupled to the communications unit and the storage unit. The at least one processor is configured to execute the instructions to extract, from a hierarchical data structure, an index value associated with a corresponding element of permissioning data. The hierarchical data structure is maintained within the storage unit, and the at least one processor is further configured to access cryptographic data maintained within a first element of a distributed ledger. The cryptographic data includes a first public cryptographic key associated with the hierarchical data structure. The at least one processor is further configured to generate a second public cryptographic key based on the first public cryptographic key and the extracted index value, and encrypt first data using the second public cryptographic key. The encrypted first data is associated with the corresponding element of permissioning data, and the second public cryptographic key is discarded in response to the encryption of the first data.

In other examples, an apparatus includes a communications unit, a storage unit storing instructions, and at least one processor coupled to the communications unit and the storage unit. The at least one processor is configured to execute the instructions to access encrypted data maintained within a distributed ledger. The encrypted data is associated with an element of permissioning data maintained within a hierarchical data structure, and the permissioning data element is characterized by a corresponding index value. The at least one processor is further configured to obtain a first private cryptographic key associated with the hierarchical data structure, generate a second private cryptographic key based the first private cryptographic key and the corresponding index value, and perform operations that decrypt the encrypted data using the second private cryptographic key. The second private cryptographic key is discarded in response to the decryption of the encrypted data.

Further, in some examples, an apparatus includes a communications unit, a storage unit storing instructions, and at least one processor coupled to the communications unit and the storage unit. The at least one processor is configured to execute the instructions to obtain (i) a master cryptographic key associated with a first computing system and (ii) elements of permissioning data maintained within a hierarchical data structure. The permissioning data elements are associated with corresponding ones of a plurality of second computing systems. The at least one processor is further configured to generate index values representative of the permissioning data elements, and the generated index values are indicative of a position of corresponding ones of the permissioning data elements within the hierarchical data structure. Based on the obtained master cryptographic key, the at least one processor is further configured to generate a public cryptographic key associated with the hierarchical data structure. The at least one processor is further configured to perform operations that generate an element of a distributed ledger that includes the public cryptographic key, the permissioning data elements, and the generated index values, and to append the generated element to the distributed ledger, the permissioning data elements and the generated index values being maintained within the hierarchical data structure.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
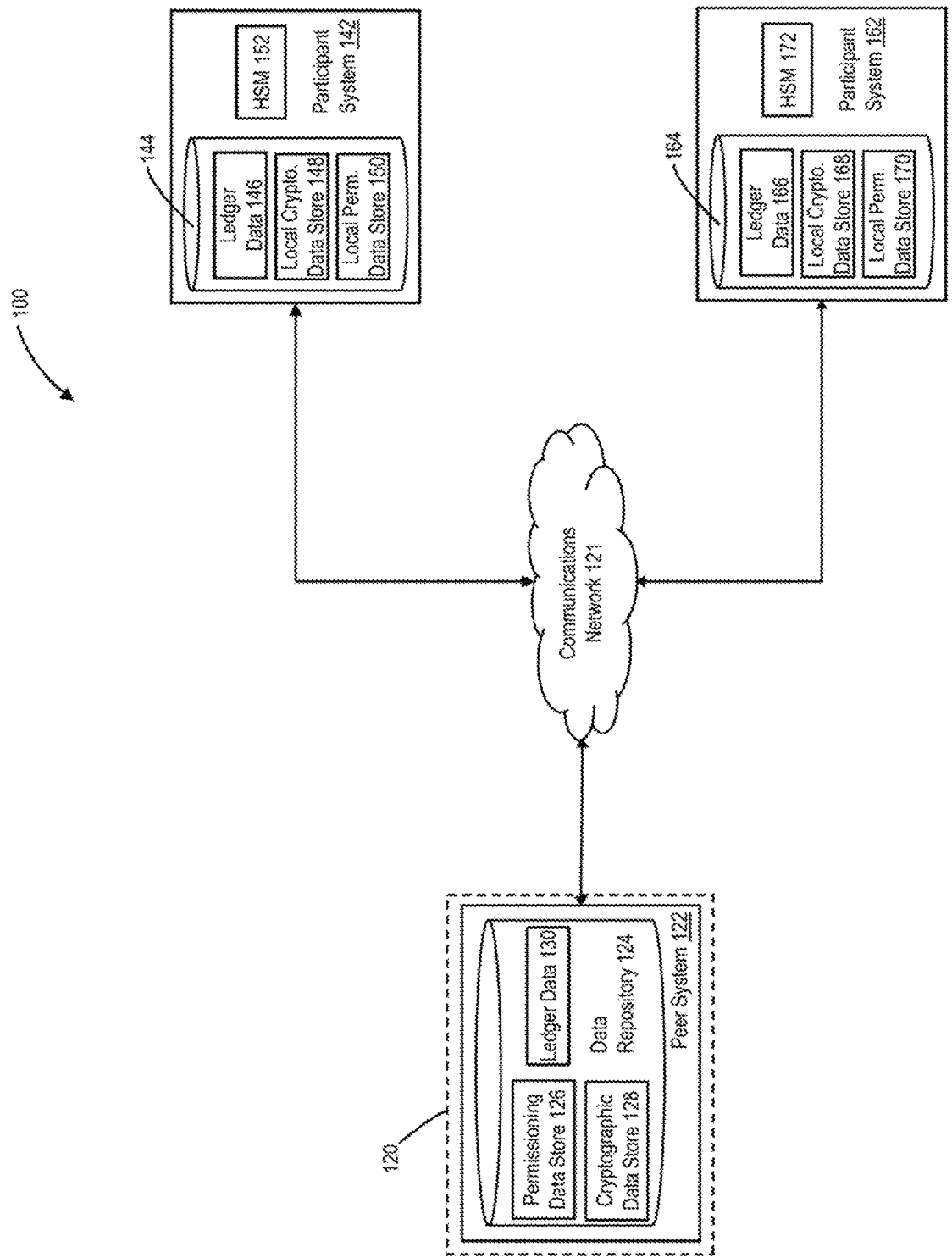
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include one or more peer systems 120, such as peer system 122, and one or more participant systems, such as participant systems 142 and 162, each of which may be interconnected through any appropriate combination of communications networks, such as network 121. Examples of network 121 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some instances, each of peer systems 120, including peer system 122, and participant systems 142 and 162 may represent a computing system that includes one or more servers (not depicted in FIG. 1) and tangible, non-transitory memories storing executable code and application modules. Further, each of the servers may include one or more processor-based computing devices, which may be configured to execute portions of the stored code or application modules to perform operations consistent with the disclosed embodiments. In other instances, one or more of peer systems 120 (including peer system 122), participant system 142, or participant systems 162 may correspond to a distributed system that includes computing components distributed across one or more networks, such as network 121, or other networks, such as those provided or maintained by cloud-service or -storage providers (e.g., Google Cloud™, Microsoft Azure™, etc.). Additionally, one or more of peer systems 120 (including peer system 122), participant system 142, or participant systems 162 can also be incorporated into a single computing system or incorporated into multiple computing systems.

By way of example, peer system 122, participant system 142, and participant system 162 may each be associated with, or maintained by, a hierarchically structured enterprise having discrete organizational units subdivided into corresponding sets of nested and linked organizational subunits. For instance, the hierarchically structured enterprise may correspond to a financial institution, which may be subdivided into discrete business units, such as, but not limited to, retail banking, investment banking, or wealth management. Further, each of the discrete business units may be organized in accordance with one or more hierarchically arranged and interactive sub-units, such as discrete departments operating within each of the business units, discrete groups operating within corresponding ones of the departments, or discrete sub-groups operating within corresponding ones of the groups.

Referring back to FIG. 1, and to facilitate a performance of any of the exemplary processes described herein, peer system 122 may establish and maintain, within the one or more tangible, non-tangible memories, one or more structured or unstructured data repositories or databases, such as data repository 124. By way of example, data repository 124 may include, but is not limited to, permissioning data store 126, cryptographic data store 128, and ledger data 130.

In some instances, permissioning data store 126 may maintain, within a hierarchical data structure, one or more elements of permissioning data that identify and characterize an ability of a network-connected device or computing system, such as participating systems 142 and 162, to access or modify data associated with one or more organizational units, and corresponding organizational sub-units, of a hierarchically structured enterprise, such as the financial institution described herein. For example, and as described herein, the hierarchical data structure may dispose the organizational units and sub-units into a hierarchical tree-like structure, such as a directory information tree, and the permissioning data elements may be formatted in accordance with one or more appropriate directory or application protocols, such as, but not limited to, an Active Directory™ protocol or a lightweight directory access protocol (LDAP™). In further instances, and consistent with the disclosed embodiments, permissioning data store 126 may also maintain, on a temporary or permanent basis, indexed permissioning data that associates elements of the permissioning data, e.g., as maintained within the hierarchical data structure, with corresponding index values generated using any of the exemplary processes described herein.

Cryptographic data store 128 may include one or more master cryptographic keys associated with peer system 122 and additionally, or alternatively, generated or provisioned by another node system operating within environment 100, along with corresponding chain codes and revocation lists. Further, in some instances, cryptographic data store 128 may also maintain, on a temporary or permanent basis, one or more of the pairs of hierarchical, asymmetric cryptographic keys (such as the "master" public cryptographic key and the "master" public cryptographic key described herein) generated for corresponding ones of the organizational units identified within the indexed permissioning data, e.g., prior to or subsequent to the provisioning of these cryptographic keys to the network-connected devices and computing systems associated with the organizational units using any of the exemplary processes described herein.

Further, and as described herein, ledger data 130 that maintains a local copy of a cryptographically secure distributed-ledger data structure, such as a permissioned distributed ledger. For example, the distributed ledger may include one or more ledger blocks that immutably record and track one or more of the master public cryptographic keys generated for corresponding ones of the organizational units identified within the indexed permissioning data, e.g., by peer system 122 using any of the exemplary processes described herein.

The distributed ledger may include one or more ledger blocks that immutably record and track one or more elements of the indexed permissioning data described herein, and additionally, or alternatively one or more ledger blocks that include encrypted data characterizing customer or business data generated and encrypted by network-connected devices and systems associated with associated with the organizational units and sub-units of the hierarchically structured enterprise, such as, but not limited to, participant systems 142 or 162. Further, and for a corresponding portion of the encrypted data, one or more of the ledger blocks may also include an index value characterizing an element of permissioning data (e.g., as extracted from the indexed permissioning data) associated with a network-connected device or computing system that generated and/or encrypted the document data, e.g., participating system 142 or 162.

In some instances (not illustrated in FIG. 1), one or more of peer systems 120, including peer system 122, may perform consensus-based operations that generate additional ledger blocks of the permissioned distributed ledger, and that append these newly generated ledger blocks to the distributed ledger to generate an updated version of the distributed ledger, e.g., for distribution among each of the node and participating systems operating within environment 100. Further, although not illustrated in FIG. 1, the newly generated ledger blocks may also include additional data that facilitates an immutability and a cryptographic security of the distributed ledger, such as, but not limited to, one or more hash values of the information packaged into the newly generated ledger blocks.

In some examples, illustrated in FIG. 1, participant system 142 may establish and maintain, within the one or more tangible, non-tangible memories, one or more structured or unstructured data repositories or databases, such as data repository 144. By way of example, data repository 144 may include, but is not limited to, ledger data 146 that maintains a local copy of a cryptographically secure distributed-ledger data structure, such as the publicly accessible or permissioned distributed ledger.

For example, the distributed ledger may include one or more ledger blocks that immutably record and track one or more of the master public cryptographic keys generated for corresponding ones of the organizational units identified within the indexed permissioning data, along with one or more additional ledger blocks that immutably record and track one or more elements of the indexed permissioning data described herein. Further, the distributed ledger may also include one or more ledger blocks that include encrypted customer or business data, and in some instances, an index value characterizing an element of permissioning data (e.g., as extracted from the indexed permissioning data) associated with a network-connected device or computing system that generated and/or encrypted the document data.

In further examples, illustrated in FIG. 1, data repository 144 may also include a local cryptographic data store 148 and a local permissioning data store 150. Local cryptographic data store 148 may, in some instances, correspond to a temporary storage for the local public cryptographic key or the local private cryptographic key during any of the exemplary data encryption or decryption processes described herein. In other instances, local cryptographic data store 148 may maintain, on a temporary or permanent basis, local copies of the master public cryptographic key or master public cryptographic key, e.g., as provisioned to participant system 142 by peer system 122 across network 121 via a secure programmatic interface. Further, permissioning data store 150 may maintain, on a temporary or permanent basis, a local copy of the indexed permissioning data generated by peer system 122, e.g., as provisioned to participant system 142 by peer system 122 across network 121 via the secure programmatic interface Participant system 142 may also include an additional physical computing device, such as a hardware security module (HSM) 152 that securely maintains a local copy of the master private cryptographic key and in some instances, a local copy of the master public cryptographic key, a chain code corresponding to the master private cryptographic key, an/or a revocation list associated with the master private cryptographic key. In some instances, HSM 152 may be communicatively coupled to participant system 142 through a corresponding hardware-based interface (not illustrated in FIG. 1), and peer system 122 may provision the master private cryptographic key and/or the master public cryptographic key to participant system 142 for storage within HSM 152 through a secure, out-of-band communications channel. In other instances, and consistent with the disclosed embodiments, HSM 152 may be preloaded with the local copies of the master private cryptographic key and/or the master public cryptographic key prior to distribution and connection to participant system 142, e.g., via the hardware-based interface described herein.

Additionally, as illustrated in FIG. 1, participant system 162 may also establish and maintain, within the one or more tangible, non-tangible memories, one or more structured or unstructured data repositories or databases, such as data repository 164. By way of example, data repository 164 may include, but is not limited to, ledger data 166, local cryptographic data store 168, and local permissioning data store 170. In certain aspects, each of ledger data 166, local cryptographic data store 168, and local permissioning data store 170 may include data similar to that described above in reference corresponding ones of ledger data 146, local cryptographic data store 148, and local permissioning data store 150, e.g., as maintained within data repository 144 of participant system 142.

Further, participant system 162 may also include an additional computing device, such as hardware security module (HSM) 172, communicatively coupled to participant system 162. In some examples, HSM 172 may include an additional local copy of the master private cryptographic key generated by peer system 122 (and in additional instances, the master public cryptographic key), and may be structured and provisioned similarly to HSM 152 of participant system 142.

II. Exemplary Computer-Implemented Processes for Dynamically Generating and Managing Asymmetric Cryptographic Keys Using Distributed Ledgers In some instances, many hierarchically organized enterprises, such as a financial institution or a governmental entity, may be characterized by multiple, discrete, and in some instances, geographically dispersed organizational units, each of which may be further subdivided into corresponding sets of hierarchically arranged and interactive organizational sub-units. For example, the financial institution may be characterized by multiple, discrete business units, such as, but not limited to, retail banking, investment banking, or wealth management, and each of the discrete business units may be further organized in accordance with one or more hierarchically arranged and interactive sub-units, such as, but not limited to, discrete departments operating within each of the business units, discrete groups operating within corresponding ones of the departments, or discrete sub-groups operating within corresponding ones of the groups.

Figure 2A:
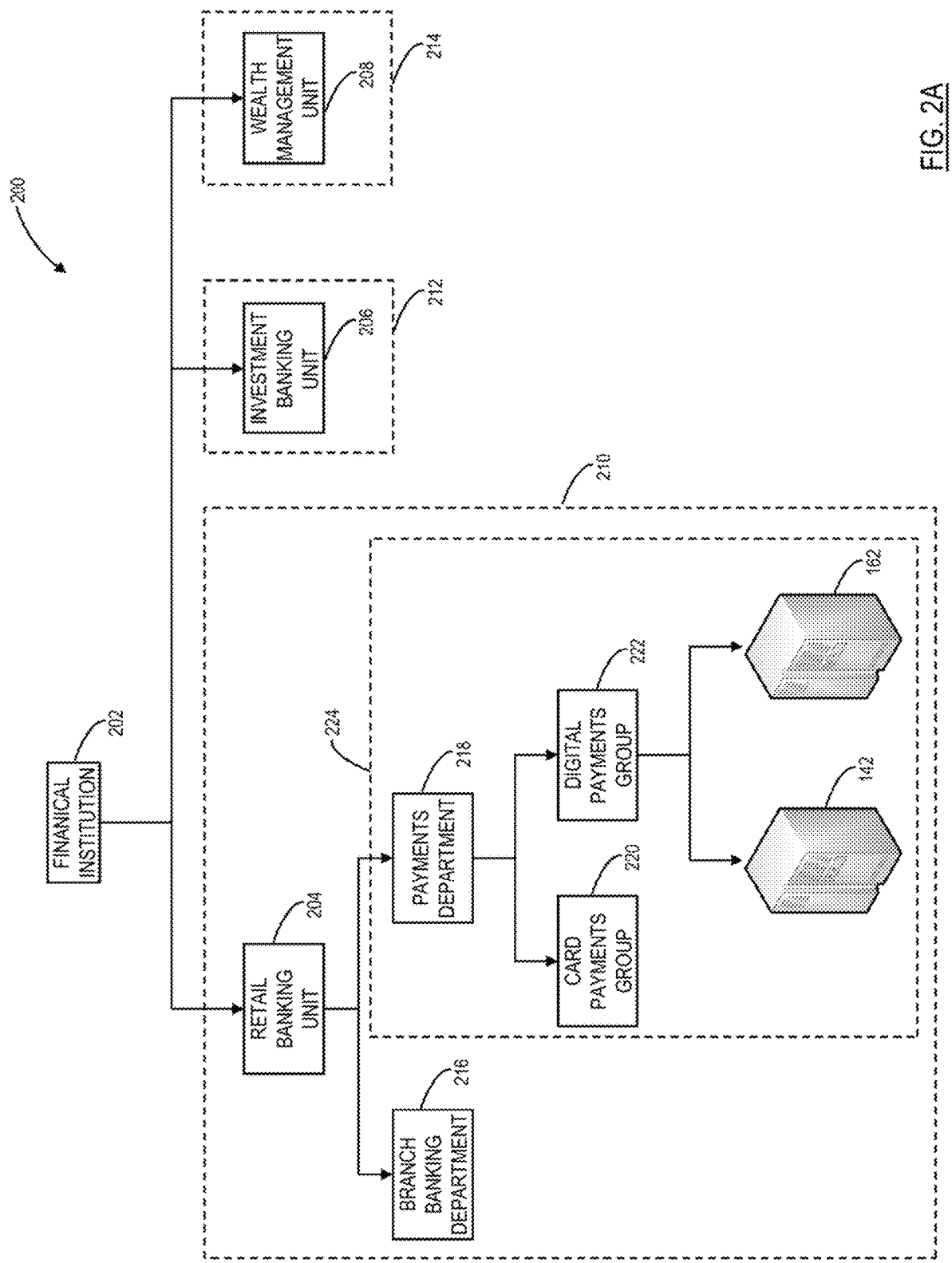
FIG. 2A is a diagram illustrating an exemplary organizational structure of an enterprise, consistent with disclosed embodiments.

FIG. 2A illustrates an exemplary hierarchical structure 200 that characterizes one or more hierarchically organized enterprises, such as the financial institution described herein. In some instances, each of the organizational units of the hierarchically organized enterprise, and the corresponding nested organizational sub-units, arranged in accordance with a hierarchical, tree-like organizational structure, in which each of the organizational units an internal root node for a corresponding subtree of hierarchically arranged sub-units.

As illustrated in FIG. 2A, hierarchical structure 200 may include internal nodes 204, 206, and 208 that correspond, respectively, to organizational units of the hierarchically organized enterprise. In some instances, each of internal nodes 204, 206, and 208 may also function as internal "root" nodes for corresponding ones of organizational sub-trees 210, 212, and 214.

By way of example, internal node 204 may correspond to the retail banking unit of the financial institution, internal node 206 may correspond to the investment banking unit of the financial institution, and internal node 208 may correspond the wealth management unit of the financial institution. Further, organizational sub-tree 210 may include internal nodes 216 and 218, which correspond respectively to a branch banking department and a customer payments department of the retail banking unit, and additional internal nodes 220 and 222, which correspond respectively to a card payments group and a digital payments group operating within the payments department.

In some instances, internal node 218 (e.g., representative of the payments department) may also correspond to an internal root node of an additional organizational sub-tree 224 that includes internal nodes 220 and 222 and is representative of the hierarchically organized groups and sub-groups operating within the payments department. Further, although not illustrated in FIG. 2A, one or more of internal node 220 (e.g., representative of the card payment group operating within the payment department) or internal node 222 (e.g., representative of the digital payments group operating within the payment department) may also correspond to another internal root node associated with an additional organizational sub-tree (e.g., as representative of one or more sub-groups operating within the card payment group or the digital payments group).

Further, and as described herein, the enterprise, such as the hierarchically organized financial institution described in FIG. 2A, may also be associated with one or more employees and hardware-based assets, each of which may be assigned to corresponding ones of the organizational units and sub-units of the enterprise, such as, but not limited to, the retail banking unit, the branch banking and payments departments of the hierarchically organized financial institution. By way of example, and as illustrated in FIG. 2A, participant systems 142 and 162 may each be associated with, and assigned to, a digital payments group (e.g., internal node 222 of FIG. 2) operating within the payments department (e.g., internal node 218 of FIG. 1) of the retail banking unit (e.g., internal node 204 of FIG. 2), and may be operated or accessed by employees assigned to the digital payments group.

In additional instances, the network-connected devices and computing systems assigned to the various organizational units and sub-units of the hierarchically organized financial institution may generate, access, and modify, elements of sensitive customer and business data subject not only to internal confidentiality and security requirements imposed by the financial institution, but also to external confidentiality and security requirements imposed by one or more regulatory authorities. To maintain a confidentiality and security of the generated, accessed, or modified data, and to ensure a compliance with these imposed requirements, each of the business units, departments, groups, and/or sub-groups of the hierarchically organized financial institution may be associated with one or more corresponding elements of permissioning data. In some instances, the permissioning data elements may, among other things, specify an ability of a network-connected device or computing system assigned to a particular organizational unit and corresponding sub-unit(s) to access or modify data generated by other network-connected devices or computing system associated with that particular organizational unit and corresponding sub-unit(s), and data generated by other organizational units and/or sub-units of the hierarchically organized financial institution.

For example, and as illustrated in FIG. 2A, participant system 142 and participant system 162 may each by assigned to, and may operate within, the digital payments group, e.g., and may represents leaf nodes associated with internal node 222 in hierarchical structure 200. In some instances, the elements of permissioning data associated with the digital payments group (and with internal node 222) may permit participant system 142, or participant system 162, to access and modify elements of sensitive data generated by any additional, or alternate, network-connected device or computing system operating within the digital payment group (e.g., and represented by child nodes of internal node 222), and to access, but not modify, elements of sensitive data generated by network-connected device and computing systems operating within other groups within the payment department, such as, but not limited to, the card payment group (e.g., as represented by internal node 220 of FIG. 2A).

Further, although not illustrated in FIG. 2A, the elements of permissioning data associated with the digital payments group (and with internal node 222) may also permit participant system 142, or participant system 162, to access and modify elements of sensitive data generated by network-connected computing systems operating within one or more sub-groups of the digital payments group, e.g., as represented by child nodes within an additional sub-tree associated with internal node 222. Further, similar elements of permissioning data may characterize one or more access or modification permissions assigned to: (i) network-connected devices operating within the card payment group (e.g., and linked to internal node 220) and any additional, or alternate, group operating within the payment department (e.g., and linked to internal node 218); (ii) network-connected devices and computing systems operating within the branch banking department (e.g., and linked to internal node 216) and additional, or alternate, departments of the retail banking unit (e.g., and linked to internal node 206); and (iii) network-connected devices and computing systems operating within departments, groups, and sub-groups of other business units, such as, but not limited to, the investment banking unit (e.g., and linked to internal node 208) and the wealth management unit (e.g., and linked to internal node 208).

By way of example, the elements of permissioning associated with the each of the business units, departments, and groups (or sub-groups) of the financial institution, e.g., as illustrated in FIG. 2A, may be maintained in a hierarchical data structure provisioned, or available, to each network-connected device or computing system operating within these business units, departments, and groups (or sub-groups). In some instances, the hierarchical data structure may be formatted in accordance with one or more appropriate directory or application protocols, such as, but not limited to, an Active Directory™ protocol or a lightweight directory access protocol (LDAP™), and the hierarchical data structure may maintain, for each of the business units, departments, and groups, and for the network-connected devices and systems operating within these organization units and sub-units, a value of a unique identifier, values of one or more attributes, and the corresponding elements of permissioning data.

Figure 2B:
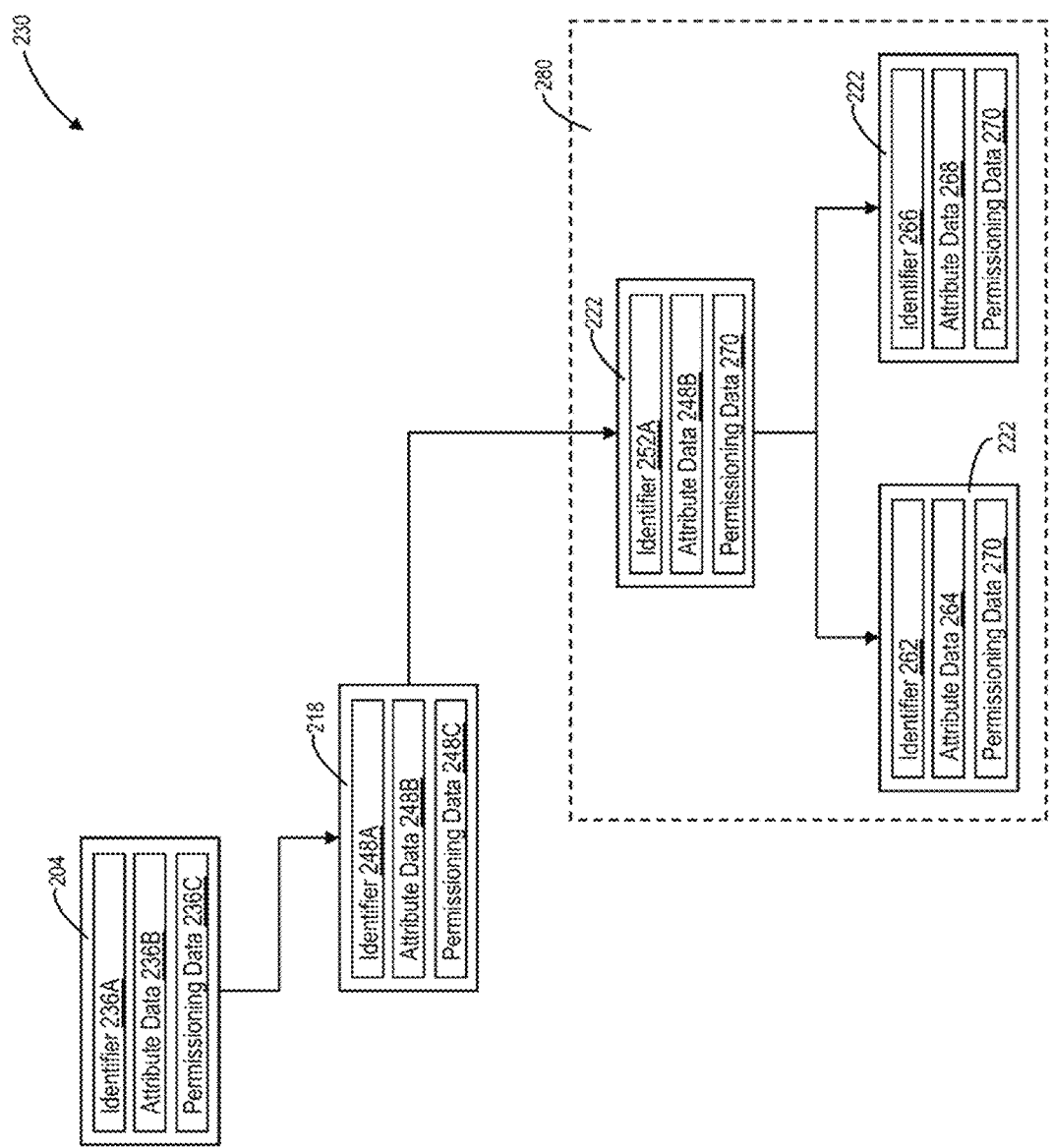
FIG. 2B is a diagram illustrating a portion of an exemplary hierarchical data structure, consistent with the disclosed embodiments.

FIG. 2B is a schematic diagram of a portion of a hierarchical data structure 230 that maintains the elements of permissioning data associated with the organizational units and sub-units of the financial institution. For example, as illustrated in FIG. 2B, hierarchical data structure 230 may maintain, for internal node 206 representative of the retail banking unit, a unique identifier 236A, attribute data 236B, and permissioning data elements 236C. In some instances, identifier 236A may correspond to a globally unique identifier within the application or directory protocol, such as, but not limited to, a distinguished name (DN) that identifies internal node 206 within LDAP™ (e.g., "DN=RetailBanking"). Attribute data 236 may include values of one or more LDAP™ attributes of internal node 204 and the retail banking unit, and further, permissioning data elements 236C may include information specifying any of the exemplary permissions described herein, which characterize an ability of network-connected devices and computing systems operating within the departments, groups, and/or sub-groups of the retail banking unit to generate, access, or modify elements of sensitive data.

As illustrated in FIG. 2B, hierarchical data structure 230 may also maintain corresponding unique identifiers, attribute data, and permissioning data elements for the payments department of the retail banking unit (e.g., identifier 248A, attribute data 248B, and permissioning data elements 248C of internal node 218). Further, hierarchical data structure 230 may maintain similar identifiers and attribute data for the digital payments group (e.g., identifier 252A and attribute data 252B of internal node 222), and for each of participant systems 142 and 162 that operate within the digital payments group (e.g., identifier 262 and attribute data 264 of participant system 142, and identifier 266 and attribute data 268 of participant system 162).

In some instances, and as described herein, the digital payment group (e.g., as represented by internal node 218), and each of the network-connected devices and computing systems operating within the digital payments group (e.g., participant system 142 or participant system 162) may be associated with one or more common elements of permissioning data, e.g., permissioning data elements 270 of FIG. 2B. For example, permissioning data elements 270 may permit participant system 142, or participant system 162, to access and modify elements of sensitive data generated by any additional, or alternate, network-connected device or computing system operating within the digital payment group (e.g., and represented by child nodes of internal node 222), and to access, but not modify, elements of sensitive data generated by network-connected device and computing systems operating within other groups within the payment department, such as, but not limited to, the card payment group (e.g., as represented by internal node 220 of FIG. 2A).

Further, each of the network-connected devices and computing systems that operate within a corresponding organization unit, or sub-unit, of the hierarchically organized financial institution may establish a corresponding permissioning group within hierarchical data structure 230. For example, as illustrated in FIG. 2B, internal node 222, which represents the digital payments group, and participant systems 142 and 162, within operate within the digital payments group and are linked to internal node 222, may be associated with one or more common elements of permissioning data, such as permissioning data elements 270 and as such, may establish a corresponding permissioning group 280 within hierarchical data structure 260. In some instances, one or more computing systems associated with the hierarchically organized financial institution, such as peer system 122 of FIG. 1, may perform any of the processes described herein to generate index values representative of the elements of permissioning data maintained within hierarchical data structure 230, and to assign a common index value representative of permissioning group 280 to each consistent component of permissioning group 280.

In some examples, one or more network-connected computing systems associated with the hierarchically organized financial institution, such as, not limited to, peer system 122, may perform operations that establish and manage a cryptographically secure distributed ledger data structure, such as a permissioned distributed ledger, capable of sharing documents and other data between the network-connected devices and systems operating within corresponding ones of the organizations units and/or sub-units described herein, such as participant system 142 or participant system 162. For instance, participant system 142 generate or modify one or more elements of confidential data associated with the digital payments group of the financial institution and may submit portions of the generated or modified elements of confidential data to one or more peer systems associated with the financial instruction, such as peer system 122 of FIG. 1. Further, the one or more peer systems, including peer system 122, may collectively perform any of the exemplary processes described herein to generate an additional ledger block of the distributed ledger that immutably records and tracks the generated or modified elements of confidential data, and to broadcast an updated version of the permissioned distributed ledger, which includes the additional ledger block, to each of the network-connected devices and computing systems of the financial institution.

Given the confidential nature of the generated or modified data elements, and the varied access or modification permissions assigned to these devices and computing systems associated with the financial institution (e.g., the elements of permissioning data maintained within hierarchical data structure 230 of FIG. 2B), participant system 142 or 162 may perform operations that encrypt the generated or modified data elements prior to submitting the generated or encrypted data for immutable recordation within the distributed ledger. For instance, participant system 142 may encrypt the generated or modified data using a public cryptographic key (e.g., the public component of an asymmetric cryptographic key pair) that reflects one or more data access or modification permissions assigned to participant system 142 (e.g., as specified within permissioned data elements 270 assigned to permissioning group 280 of FIG. 2B).

The encryption of the generated or modified data using the public cryptographic key associated with the access or modification permission assigned to participant system 142, and the immutable recordation of that encrypted data within the additional ledger blocks of the distributed ledger, may enable the one or more peer systems freely distribute the newly updated distributed ledger to each of the participant devices or systems, as only a permissioned subset of the participant devices or systems, such as participant system 162, can access and decrypt the encrypted data using the corresponding private cryptographic key of the asymmetric cryptographic key pair that reflects the data access or modification permissions assigned to participant system 142. For example, as participant systems 142 and 162 operate within the digital payment group of the financial institution, each of participant systems 142 and 162 may be disposed within a permissioning group that includes the digital payments group (e.g., permissioning group 280 of FIG. 2B, which includes internal node 222 and participant systems 142 and 162), as such, each of participant systems 142 and 162 may share a common data access or modification permission, and may access a common pair of permission-based asymmetric cryptographic keys.

In some instances, one or more network-connected computing systems, such as peer system 122, may perform key-management and distribution operations that generate a permission-based pair of asymmetric cryptographic keys for each of the data access and modification permissions assigned to each organizational units and sub-unit within the hierarchically organized financial institution (e.g., based on corresponding elements of permissioning data maintained for each of the internal nodes within hierarchical data structure 230 of FIG. 2B. Peer system 122 may perform additional operations that generate a revocation list associated with each of the asymmetric cryptographic key pairs, and that distribute a public cryptographic key associated with each of the asymmetric cryptographic key pairs to corresponding ones of the participating devices and systems, e.g., across network 121 through a secure programmatic interface. In further instances, peer system 122 may also perform any of the exemplary processes described herein to distribute a private cryptographic key associated with each of the asymmetric cryptographic key pairs to the participating devices and systems through a secure, out-of-band communications channel, such as, but not limited to, through a hardware security module (HSM).

Through the performance of these key management and distribution processes, each of the participating devices and systems, such as participant system 142 and participant system 162, may maintain a corresponding public cryptographic key within a portion of a tangible, non-transitory memory, and may maintain a corresponding private cryptographic key within a secure memory device, such as the HSM described herein. Further, in response to a detected comprise of one or more of the asymmetric cryptographic key pairs, or upon an expiration of one or more of the asymmetric cryptographic key pairs, peer system 122 may perform additional key management and distribution operations that revoke all or a portion of the asymmetric cryptographic key pairs, e.g., based on the corresponding revocation list, and generate and distribute additional asymmetric cryptographic key pairs to corresponding ones of the participant devices and systems, e.g., using any of the processes described herein.

While certain these key generation and distribution processes can result in a cryptographically secure exchange of encrypted data using a distributed ledger data structure, these processes can often require hardware and computational effort dedicated not only to the generation and secure distribution of an initial pairs of asymmetric cryptographic keys associated with data access or modification permission, but also to the ongoing revocation or replacement of these pairs of asymmetric cryptographic keys in response to a detected comprise, in response to an expiration of one or more pairs of the asymmetric cryptographic keys, or in response to a change in a data access or modification permission assigned to one, or more, or the organizational units or sub-units that characterize the financial institution. Further, each of the participant devices or systems, such as participating systems 142 and 162, also incorporate additional tangible, non-transitory memories to maintain the public cryptographic keys associated with each of the assigned data access permissions, and further, secure memory devices, such as HSMs, capable of maintaining the private cryptographic keys associated with each of the assigned data access permissions. The need to securely maintain, and in some instances, securely rotate or interchange, private cryptographic keys associated with a large and increasing number of assigned assess permissions can increase a likelihood of a comprise involving one or more of these private cryptographic keys, which may expose sensitive data to malicious parties.

In some exemplary embodiments, as described herein, one or more network-connected computing systems associated with a hierarchically organized enterprise, such as peer system 122 of FIG. 1, may perform operations that generate a master pair of asymmetric cryptographic keys for an organizational unit, organizational sub-unit, or permissioning group within the hierarchically organized enterprise, such as the retail business unit of the financial institution. Peer system 122 may perform any of the exemplary processes described herein to immutably record, within a ledger block of a cryptographically secure distributed ledger data structure (e.g., the permissioned distributed ledger described herein), a master public cryptographic key associated with the organizational unit and indexed permissioning data characterizing the data access permissions assigned to each of the organizational unit, organizational sub-units, or permissioning groups within the hierarchically organized enterprise. Further, peer system 122 may also perform any of the exemplary processes described herein to distribute a master private cryptographic key associated with the organization unit to each of the network-connected devices or systems associated that organizational unit through a secure, out-of-band communications channel, such as, but not limited to, through a hardware security module (HSM).

In some instances, a network-connected device or system associated with the organizational unit, such as participant system 142 operating within the retail banking unit of the hierarchically organized financial institution, may access the permissioned distributed ledger and obtain a local copy of the master public cryptographic key (e.g., from one or more ledger blocks of ledger data 146 in FIG. 1) and a local copy of the indexed permissioning data (e.g., from the one or more ledger blocks of ledger data 146 in FIG. 1). To encrypt one or more elements of generated or modified data in accordance with a particular data access permission assigned to an organizational unit or sub-unit of the enterprise, participant system 142 may extract, from the local copy of the indexed permissioning data, an index value corresponding to a particular organizational unit, organizational sub-unit, or permissioning group of the enterprise (e.g., an index value associated with permissioning group 280 of FIG. 2B).

Participant system 142 may generate a local public cryptographic key based on an application of one or more elliptic-curve key derivation algorithms to the master public cryptographic key and to the extracted index value, and may encrypt the generated or modified data using the newly generated local public cryptographic key. Further, and as described herein, participant system 142 may broadcast the newly encrypted data to one or more of peer systems 120, such as peer system 122, which may perform any of the exemplary, consensus-based processes described herein to immutably record the newly encrypted data within an additional ledger block of the permissioned distributed ledger, and participant system 142 may discard the newly generated local public cryptographic key.

In other instances, a network-connected device or system associated with the particular organizational unit, organizational sub-unit, or permissioning group, such as participant system 162 operating within the retail banking unit of the hierarchically organized financial institution, may perform any of the exemplary processes described herein to decrypt one or more elements of encrypted data using a local private cryptographic key generated dynamically on the basis of a master private cryptographic key associated with the particular organizational unit, organizational sub-unit, or permissioning group, and an index value characterizing a data access permission assigned to that organizational unit or sub-unit. For example, participant system 162 may perform any of the exemplary processes described herein to obtain the master private cryptographic key from a secure memory device, e.g., from HSM 172, and to obtain a local copy of the indexed permissioning data from the permissioned distributed ledger, e.g., from one or more ledger blocks of ledger data 166.

Participant system 162 may extract, from the local copy of the indexed permissioning data, an index value characterizing a data access permission assigned to participating system (e.g., as associated with permissioning data elements 270 of permissioning group 280 in FIG. 2B), and may generate dynamically and recursively a local private cryptographic key based on an application of one or more elliptic-curve key derivation algorithms to the master private cryptographic key and to the extracted index value. Participant system 162 may further extract encrypted data from the permissioned distributed ledger (e.g., from the one or more ledger blocks of ledger data 166), and may decrypt the encrypted data using the newly generated local private cryptographic key. Further, and as described herein, participant system 162 may perform operations that discard the newly generated local private cryptographic key upon decryption of the obtained encrypted data.

Certain of the disclosed exemplary embodiments, which facilitate a dynamic generation of asymmetric cryptographic keys by network-connected devices and systems based on a single master pair of asymmetric cryptographic keys associated with an organizational unit, and organizational sub-unit, or a permission group of an enterprise, can be implemented in addition to, or as an alternate to, conventional processes that generate and distribute, to the network-connected devices and systems within enterprise, sets of asymmetric cryptographic keys corresponding to data access permissions characterizing each of the permissioning groups within the enterprise, and conventional processes that require the network-connected devices or systems to maintain, and successively update and interchange, each of the private cryptographic keys within a corresponding secure memory device, such as an HSM.

In some instances, one or more network-computing systems associated with a hierarchically organized enterprise, such as peer system 132 of FIG. 1, may perform any of the exemplary processes described herein to generate a master pair of hierarchical, asymmetric cryptographic keys (e.g., a "master" public cryptographic key and a "master" public cryptographic key) for an organizational unit identified within indexed permissioning data. Peer system 122 may also perform any of the exemplary processes described herein to immutably record the master public cryptographic key within one or more ledger blocks of a distributed ledger data structure (e.g., the permissioned distributed ledger described herein), and to distribute securely the master private cryptographic key to each of the network-connected computing systems associated with and operating within the organizational unit, such as, but not limited to, participant systems 142 and 162 of FIG. 1, through secure out-of-band communications.

Figure 3A:
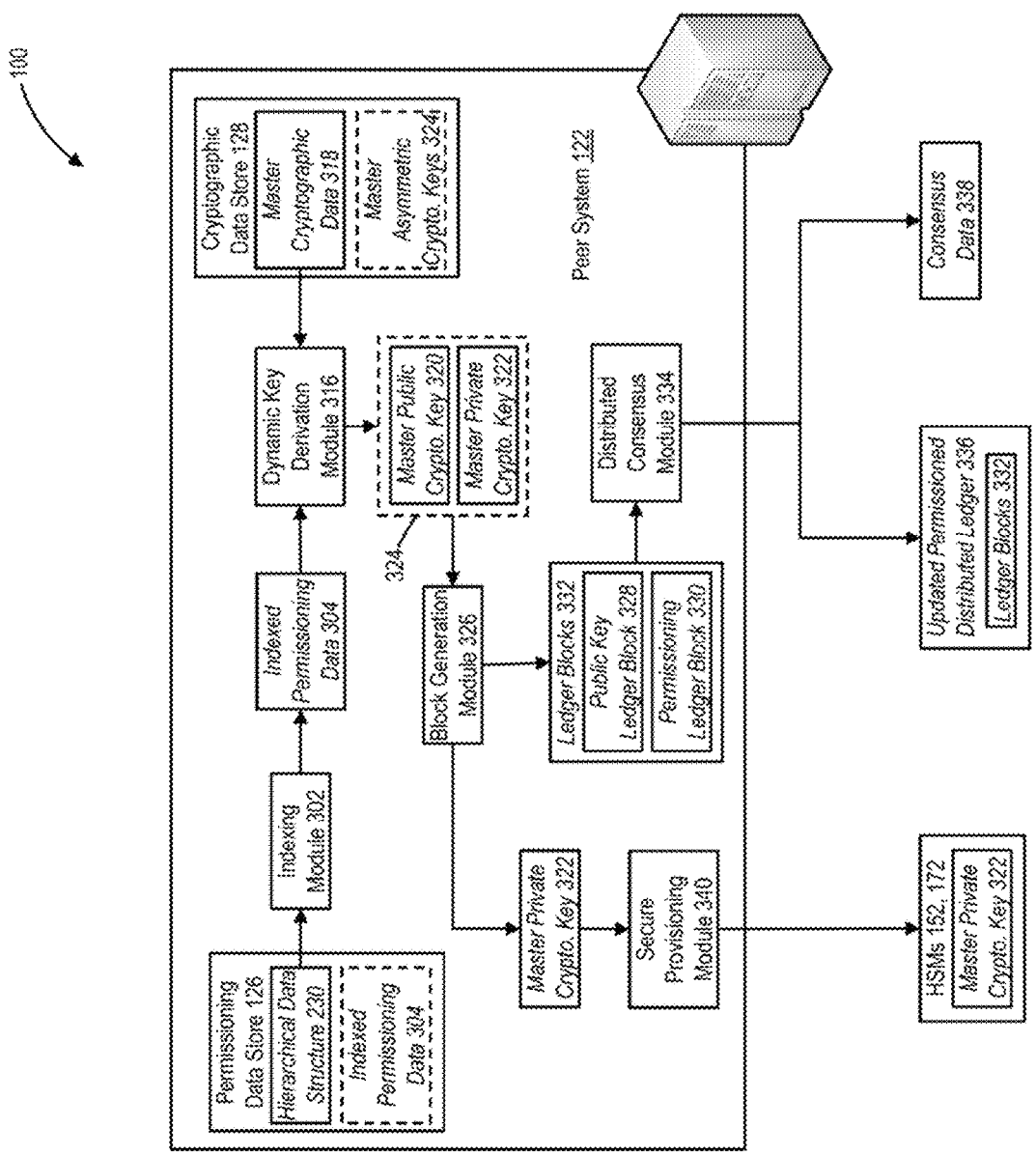
FIG. 3A is a diagram of a portion of an exemplary computing environment, consistent with disclosed embodiments.

Referring to FIG. 3A, an indexing module 302 of peer system 122 may perform operations that access permissioning data store 126 (e.g., as maintained within data repository 124), and extract a hierarchical data structure, such as hierarchical data structure 230, that identifies and characterizes one or more data access permissions assigned to each organizational unit, organizational sub-unit, or permissioning group of the enterprise and to each network-connected device or system operating within these organizational units, organizational sub-units, or permissioning groups. In some instances, and as described herein, hierarchical data structure 230 may be formatted in accordance with one or more appropriate directory or application protocols, such as, but not limited to, an Active Directory™ protocol or a lightweight directory access protocol (LDAP™), and hierarchical data structure 230 may maintain, for each of the organizational units, organizational sub-units, or permissioning groups, and associated devices or systems, a value of a unique identifier, values of one or more attributes, and the corresponding elements of permissioning data.

By way of example, and as described herein, each of the organizational units, organizational sub-units, and associated devices or systems may correspond to an internal node within an LDAP™ directory tree structure maintained within hierarchical data structure 230. As illustrated in FIG. 2B, examples of the internal nodes within hierarchical data structure 230 include, but not limited to, internal node 204 (e.g., which corresponds to the retail banking unit of the hierarchically organized financial institution), internal node 218 (e.g., which corresponds to the payments department of the retail banking unit), internal node 222 (e.g., which corresponds to the digital payments group of the payments department), and internal nodes associated with participant systems 142 and 162 (e.g., each of which operate within the digital payments group).

For each of these internal nodes, indexing module 302 may perform operations that extract a corresponding value of the unique identifier (e.g., the LDAP™ distinguished name) from hierarchical data structure 230, and compute a unique index value representative of the corresponding extracted value. Each of the index value may correspond to an alphanumeric character string having a predetermined length or composition, and indexing module 302 may generate the index values based on an application of one or more hash functions to all, or a portion, of corresponding ones of the extracted values. Examples of these hash functions include, but are not limited to, one or more functions consistent with the secured hash algorithm (SHA) standards, such as a SHA-2 or a SHA-3 algorithm.

In some instances, indexing module 302 may perform additional operations that package hierarchical data structure 230 and the computed indexing values into corresponding portions of indexed permissioning data 304. By way of example, indexing module 302 may perform operations that, for each of the internal nodes, access a corresponding portion of hierarchical data structure 230 that specifies the identifier, the one or more attribute values, and the permissioning data elements, and append a corresponding one of the computed index values to the corresponding portion of hierarchical data structure 230. Indexing module 302 may perform operations that package the augmented portions of hierarchical data structure 230 into corresponding portions of indexed permissioning data 304.

Figure 3B:
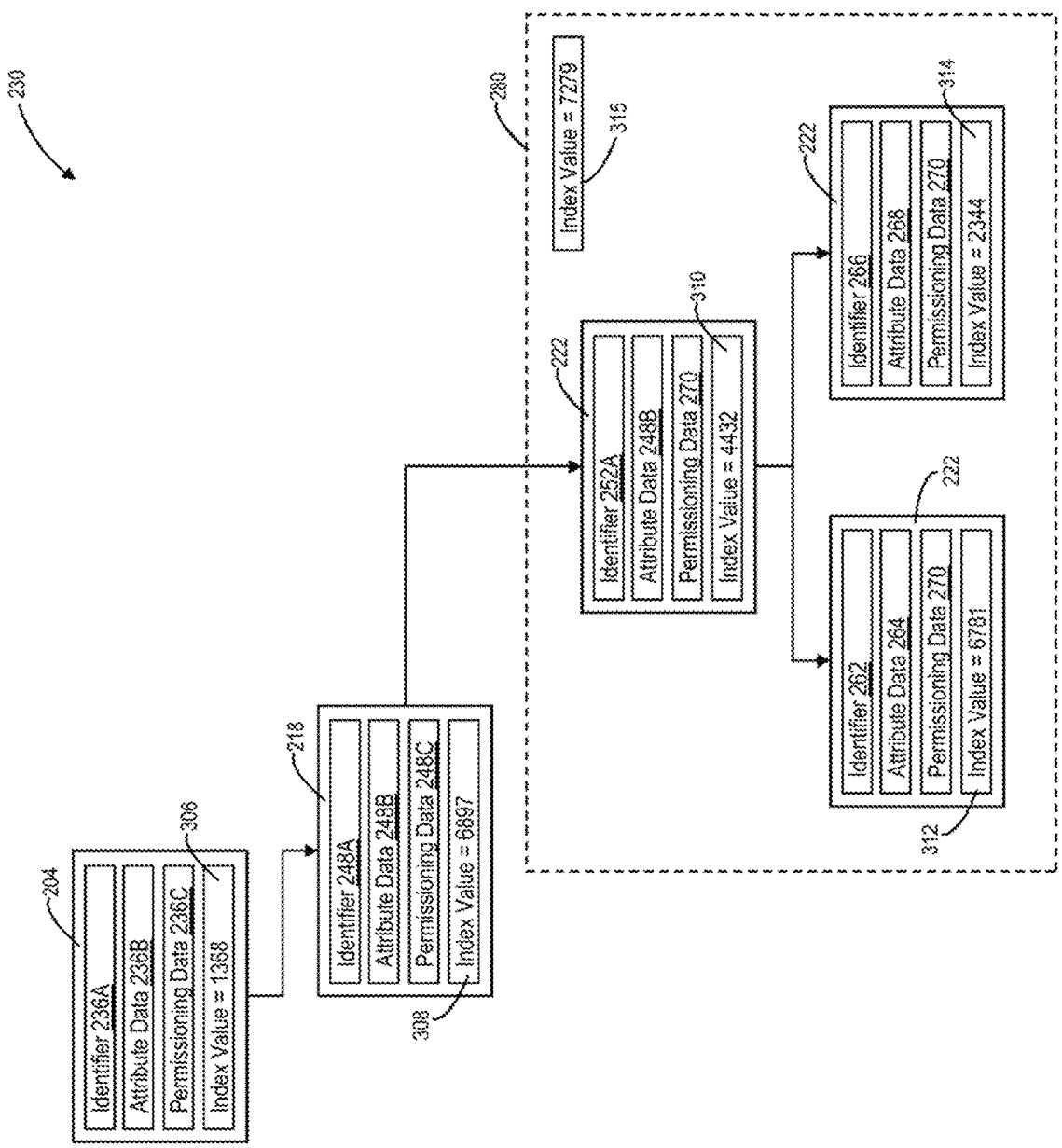
FIG. 3B is a diagram illustrating a portion of an exemplary hierarchical data structure, consistent with the disclosed embodiments.

For example, as illustrated in FIG. 3B, indexed permissioning data 304 may maintain, for internal node 204 representative of the retail banking unit, unique identifier 236A, attribute data 236B, permissioning data elements 236C, along with a computed index value 306 (e.g., "1368"). Indexed permissioning data 304 may also maintain, for internal node 218 representative of the payments department, unique identifier 248A, attribute data 248B, permissioning data elements 248C, and a computed index value 308 (e.g., "6987"), and for internal node 222 representative of the digital payments group, unique identifier 252A, attribute data 252B, permissioning data elements 270, and a computed index value 310 (e.g., "4432").

As illustrated in FIG. 3B, indexed permissioning data 304 may maintain, for participating system 142, unique identifier 262, attribute data 264, permissioning data elements 270, and a computed index value 312 (e.g., "6781"), and for participant system 162, unique identifier 266, attribute data 268, permissioning data elements 270, and a computed index value 314 (e.g., "2344"). Further, and as described herein, indexed permissioning data 304 may also include information that identifies and characterized permissioning group 280, which includes internal node 222, participant system 142, and participant system 162, and may maintain an index value 315 associated with permissioning group 280 (e.g., "7279").

In some instances, and as described herein, each of the organizational units, the organizational sub-units, and participant systems 142 and 162 (and permissioning system 280) may be referenced with indexed permissioning data 304 based on a corresponding reference index value, which represents a concatenation of a corresponding one of the computed index values, and the computed index values associated with each ancestor internal node within hierarchical data structure 230. By way of example, and as illustrated in FIG. 3B, the reference index entry of participating system 142 may correspond to "1368/6897/4432/6781," and the reference index of participating system 162 may correspond to "1368/6897/4432/2344." Further, although described as numeric character strings having a length of four, the disclosed embodiments are not limited to index values characterized by these exemplary compositions or lengths, and in other instances, indexing module 302 may computed index values characterized by any additional, or alternate, composition or length that would be appropriate to the one or more applied hash values, including index values having fixed compositions or length, or index values of varying compositions of lengths.

Referring back to FIG. 3A, indexing module 302 may perform operations that store indexed permissioning data 304 within a corresponding portion of a tangible, non-transitory memory, such as permissioning data store 126 of data repository 124. Further, indexing module 302 may also provide indexed permissioning data 304 as an input to a dynamic key derivation module 316 of peer system 122.

Dynamic key derivation module 316 may receive indexed permissioning data 304 from indexing module 302, and in some instances, may perform further operations that obtain that master cryptographic data 318 associated with the hierarchically organized enterprise, such as the financial institution described herein. By way of example, master cryptographic data 318 may include, among other things, a master cryptographic for the hierarchically organized enterprise, e.g., corresponding to root node 202 of hierarchical structure 200 of FIG. 2A, a chain code corresponding to that master cryptographic key, and a revocation list associated with the master cryptographic key (e.g., as based on index values hierarchically arranged within indexed permissioning data 304). In one instance, master cryptographic data 318 may be maintained locally within cryptographic data store 128 (e.g., within data repository 124), and dynamic key derivation module 316 may access cryptographic data store 128 and extract all or a portion of master cryptographic data 318.

In other instances, peer system 122 may perform operations that generate the master cryptographic key for the organization based on an additional master cryptographic key generated by, or maintained by, one or more additional peer systems (or other network-connected systems) operating within environment 100. For example, although not illustrated in FIG. 3A, peer system 122 may perform operations that derive the master organizational cryptographic key, and the corresponding chain code, based on an application of one or more elliptic-curve key derivation algorithms to the additional master cryptographic key (e.g., as obtained from an additional peer system within environment 100) and to a seed byte sequence of a predetermined length. For example, the predetermined length of the seed byte sequence may range between 128 bits and 512 bits, and in some instances, may correspond to a length of 256 bits.

Peer system 122 may also perform additional operations that generate a revocation list for the master organizational key based on portions of indexed permission data 304 (e.g., the index values identifying each child node of root node 202 within hierarchical structure 200), and that package the master organizational cryptographic key, the chain code, and the revocation list within master cryptographic data 318 for storage within cryptographic data store 128.

Referring back to FIG. 3A, dynamic key derivation module 316 may perform operations that derive a master asymmetric cryptographic key pair, which includes a corresponding master public cryptographic key and a corresponding master private cryptographic key, for one or more of the organizational units or organization sub-units of the enterprise. In some instances, and to generate each of the master pairs of asymmetric cryptographic keys for the organizational units or sub-units, dynamic key derivation module 316 may apply one or more elliptic-curve key derivation algorithms to the master organizational cryptographic key (e.g., as extracted from master cryptographic data 318) and an index value corresponding to each of the respective organizational units or sub-units (e.g., as extracted from indexed permissioning data 304).

For example, and as described herein, the hierarchically organized enterprise may correspond to a financial institution, and one of the organizations units may correspond to a retail banking unit (e.g., as represented by internal node 204 of hierarchical structure 200 in FIG. 2A). In some instances, to compute the master pair of asymmetric cryptographic keys for the retail banking unit, dynamic key derivation module 316 may access indexed permissioning data 304, and extract index value 306 (e.g., the character string "1368" of FIG. 3B), which corresponds to internal node 204 and to the retail banking unit. Dynamic key derivation module 316 may derive the master pair of asymmetric cryptographic keys for retail banking business unit, which includes a master public cryptographic key 320 and a corresponding master private cryptographic key 322, based on the application of the one or more elliptic-curve key derivation algorithms to the master organizational cryptographic key and to extracted index value 306 (e.g., the character In some instances, each of master public cryptographic key 320 and master private cryptographic key 322, which correspond to the retail banking unit of the financial institution, represent "child" cryptographic keys recursively derived from a "parent" cryptographic key (i.e., the master organizational cryptographic key extracted from master cryptographic data 318), and examples of the elliptic-curve key derivation algorithms include, but are not limited to, one or more child key derivation functions consistent with Bitcoin Improvement Proposal (BIP) 0032. The disclosed embodiments are, however, not limited to these examples of elliptic-curve key derivation algorithms, and in other instances, dynamic key derivation module 316 may apply any additional or alternate elliptic-curve key derivation algorithm, or any other key generation algorithm, that would be appropriate to, and consistent with, a structure or composition of the master cryptographic data 318 and comport with security requirements of the enterprise.

Dynamic key derivation module 316 may also perform operations that generate a revocation list corresponding to the chain code for master private cryptographic key 322. In some instances, the revocation list may include the representative index values of those internal nodes of indexed permissioning data 304 (e.g., as described above in FIG. 3B) that represent children of internal node 204 (e.g., as associated with the retail banking unit of the hierarchically organized financial institution), and that are included within organizational sub-tree 210, as described above.

In some examples, dynamic key derivation module 316 may perform operations that package master public cryptographic key 320, master private cryptographic key 322, the chain code, and the revocation list into corresponding portions of master asymmetric cryptographic key data 324. Further, dynamic key derivation module 316 may also perform any of the exemplary processes described herein to derive an additional pair of master asymmetric cryptographic keys for one or more additional organizational units of the hierarchically organized enterprise, such as, but not limited to, the investment banking unit of the financial institution (e.g., associated with internal node 206 of hierarchical structure 200) or the wealth management unit of the financial institution (e.g., associated with internal node 206 of hierarchical structure 200), one or more sub-units of the hierarchically organized enterprise, such as, but not limited to, the payments department (e.g., associated with internal node 218 and organizational sub-tree 224), and/or one or more permissioning groups (e.g., permissioning group 280 of hierarchical data structure 230, which includes internal node 222 (associated with the digital payments group of the financial institution), participant system 142, and participant system 162).

As illustrated in FIG. 3A, key derivation module may store master asymmetric cryptographic key data 324 within one or more tangible, non-transitory memories, e.g., within cryptographic data store 128 of data repository 124, and may further provide master public cryptographic key 320 as an input to a block generation module 326. In some instances, block generation module 326 may receive master public cryptographic key 320, e.g., from dynamic key derivation module 316, and may also access permissioning data store 126, e.g., as maintained within data repository 124, and extract one or more elements of indexed permissioning data 304.

Block generation module 326 may perform operations to generate a new public key block 328 that includes the master public cryptographic key 320 derived for the retail banking unit of the hierarchically organized financial institution, along with a corresponding hash value of master public cryptographic key 320 and an additional public cryptographic key associated with peer system 122 (not illustrated in FIG. 3A). Further, block generation module 326 may also perform operations to generate a new permissioning block 330 that includes all or a portion of indexed permissioning data 304, along with a corresponding hash value of the included portion of indexed permissioning data 304 and the public cryptographic key associated with peer system 122 (also not illustrated in FIG. 3A).

Further, although not depicted in FIG. 3A, each of new public key block 328 and new permissioning block 330 may include corresponding elements of temporal data characterizing a time or date at which block generation module 326 added master public cryptographic key 320 to new public key block 328, and a time or date at which block generation module 326 added indexed permissioning data 304 to new permissioning block 330. In some instances, block generation module 326 may package new public key block 328 and new permissioning block 330 into corresponding portions of new ledger block 332, which block generation module 326 may provide as an input to a distributed consensus module 334 of peer system 122.

In some examples, peer system 122 may perform additional operations that append to new ledger block 332, including new public key block 328 and new permissioning block 330, to a prior version of the permissioned distributed ledger, which generates a latest, longest version of the permissioned distributed ledger (e.g., an updated permissioned distributed ledger 336). For example, the additional operations may be established through a distributed consensus among the other peer systems operating within environment 100, and may include, but are not limited to, the calculation of an appropriate proof-of-work or proof-of-stake by distributed consensus module 334 prior to the other peer systems. In certain instances, peer system 122 may broadcast evidence of the calculated proof-of-work or proof-of-stake to the other node systems across network 121 (e.g., as consensus data 338).

Peer system 122 may also broadcast updated permissioned distributed ledger 336, which represents the latest, longest version of the permissioned distributed ledger, to the other peer systems operating within environment 100 and additionally or alternatively, to each of the network-connected systems that participate in the distributed-ledger network, such as participant systems 142 and 162.

In other examples, not illustrated in FIG. 3A, peer system 122 may perform additional, or alternate, operations that transmit, across network 121, all, or a portion of master public cryptographic key 320 and indexed permissioning data 304 to one or more of the network-connected systems that participate in the distributed-ledger network a, such as participant systems 142 and 162. For instances, participant systems 142 and 162 may receive the master public cryptographic key 320 and indexed permissioning data 304 via a secure, programmatic interface, such as an application programming interface, and may store master public cryptographic key 320 and indexed permissioning data 304 in corresponding portions of a tangible, non-transitory memory (e.g., within data repositories 144 or 164) on a temporary or permanent basis.

Further, as illustrated in FIG. 3A, block generation module 326 may provide master private cryptographic key 322 as an input to a secure provisioning module 340 of peer system 122, either alone or in conjunction with the generated chain code and additionally, or alternatively, the generated revocation list. As described herein, master private cryptographic key 322 may be associated with a corresponding organizational unit or sub-unit of the enterprise, such as the retail banking unit of the hierarchically organized financial institution, secure provisioning module 340 may perform operations that securely provision the master private cryptographic key (and in some instances, the generated chain code and/or the generated revocation list) to each of the network-connected devices and computing systems associated with the retail banking unit, such as participant systems 142 and 162, through a secure, out-of-band communications channel.

By way of example, secure provisioning module 340 may provision the master private cryptographic key (and in some instances, the generated chain code and/or the generated revocation list) to one or more secure memory devices communicatively coupled to peer system 122 through a corresponding hardware-based interface. Examples of the one or more secure memory devices include, but are not limited to, one or more hardware security modules (HSMs), such as HSM 152 of participant system 142 and HSM 172 of participant system 162.

By way of example, peer system 122 may also perform operations that store master public cryptographic key 320 and master private cryptographic key 322, which corresponding to the retail banking unit of the financial institution, within a corresponding portion of data repository 124, e.g., within cryptographic data store 128, along with additional or alternate pairs of master asymmetric cryptographic keys derived for other organizational units, organizational sub-units, or permissioning groups associated with the enterprise. In one instance, peer system 122 may maintain these pairs of master asymmetric cryptographic keys within cryptographic data store 128 on a permanent basis, until revocation or replacement using any of the processes described herein. In other instances, peer system 122 may perform operations that purge all, or a portion of these pairs of master asymmetric cryptographic keys from cryptographic data store 128 after a predetermined time period, or after recordation within the permissioned distributed ledger and provisioning to the secure memory devices.

As described herein, and upon inclusion of new ledger block 332 within updated permissioned distributed ledger 336, master public cryptographic key 320 and indexed permissioning data 304 may be immutably recorded within updated permissioned distributed ledger 336, and may be accessible to each of the network-connected systems that participate in the permissioned distributed-ledger network, such as participant systems 142 and 162. Further, and upon secure provisioning of master private cryptographic key 322 to each of the network-connected devices and systems associated with the corresponding organizational unit, organizational sub-unit, or permissioning group of the enterprise (e.g., the retail banking unit of the hierarchically organized financial institution), these network-connected devices and systems may be capable of accessing, and performing operations on, master private cryptographic key 322.

In some examples, one or more of the participating systems associated with the corresponding organizational unit or sub-unit of the enterprise, such as participant system 142 operating within hierarchically organized financial institution, may generate new elements of customer or business data, or may modify existing elements of customer or business data associated with a corresponding access permission within the retail banking unit. For instance, the generated or modified elements of customer or business data may require additional processing by one or more additional computing systems, such as, but not limited to, participating system 162, which may be assigned to the digital payments group operating within the payments department of the retail banking unit.

Using any of the exemplary processes described herein, participant system 142 may dynamically and recursively derive a local public cryptographic key based on master public cryptographic key 320, e.g., as maintained within public key ledger blocks 166A of ledger data 166, and on an index value that characterizes one or more elements of permissioning data associated with participant system 162, e.g., as maintained within permissioning ledger blocks 166B of ledger data 166. As described herein, participant system 142 may encrypt the generated or modified elements of sensitive customer data using the dynamically generated local public cryptographic key and in some instances, participant system 142 may perform further operations that submit the encrypted elements of sensitive customer data (e.g., either alone or in conjunction with the extracted index value) to one or more of peer systems 120 operating within environment 100, such as peer system 122, for immutable recordation within one or more additional ledger blocks of the permissioned distributed ledger described herein.

Additionally, or alternately, participant system 142 may also perform operations that transmit the encrypted elements of sensitive customer data across network 121 to participant system 162, e.g., through a secure programmatic interface, or that transmit the encrypted elements of sensitive customer data across network 121 to one or more additional computing systems associated with an external data repository or cloud-storage providers. Further, and in response to a successful encryption of the elements of sensitive customer data, participant system 142 may discard the dynamically generated local public cryptographic key, as described herein.

Figure 4A:
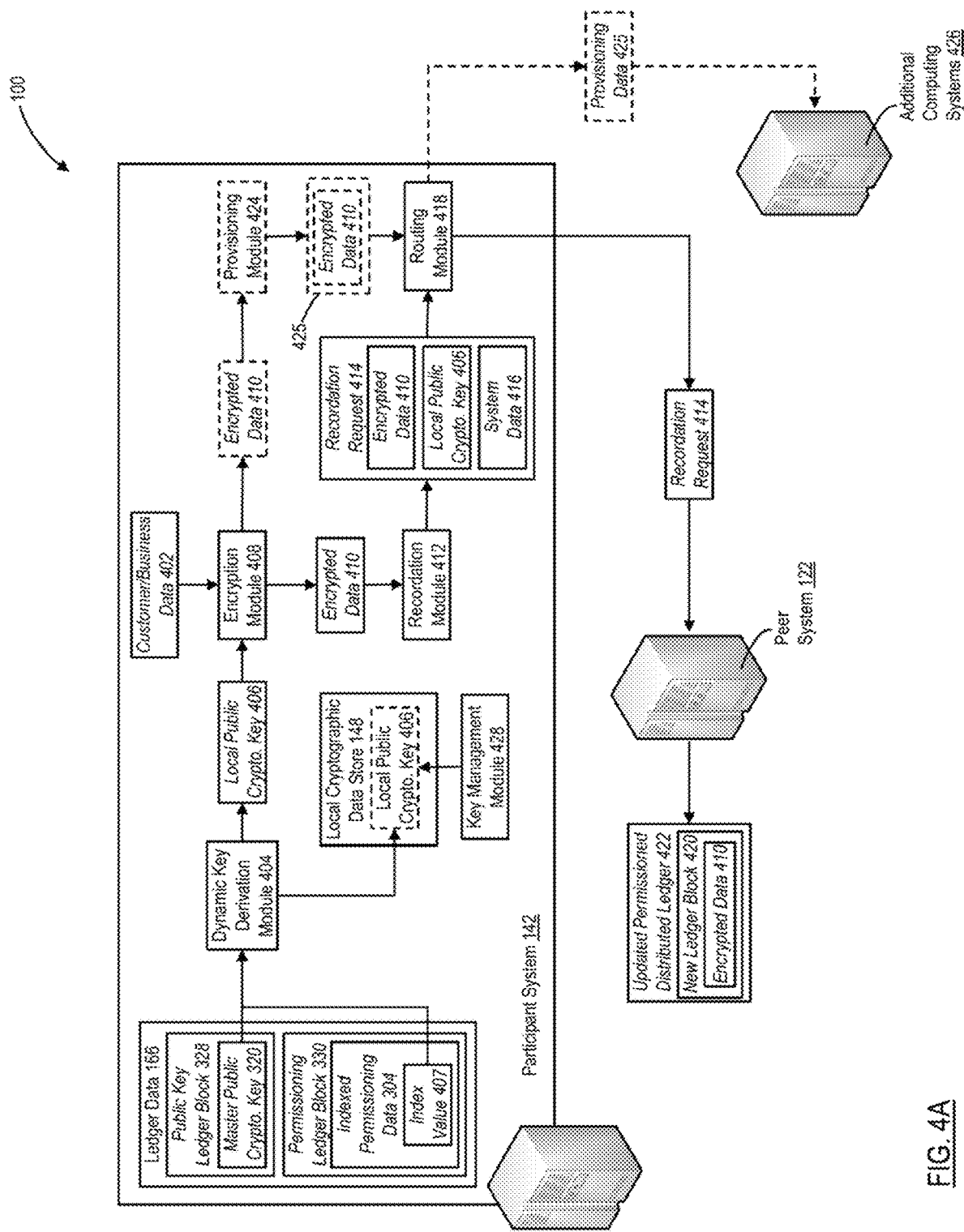
FIGS. 4A and 4B are diagrams of portions of an exemplary computing environment, consistent with disclosed embodiments.

Referring to FIG. 4A, participant system 142 may perform operations that generate new elements of customer or business data 402, or that modify existing elements of customer or business data 402. Further, and as described herein, the generated or modified elements of customer or business data 402 may require additional processing by one or more additional computing systems, such as, but not limited to, participant system 162, which may be assigned to the digital payments group operating within the payments department of the retail banking unit and further, which may be include within a corresponding permissioning group that includes participant system 142 and one or more additional network-connected devices operating within the digital payments group (e.g., permissioning group 280 of FIG. 2B).

As illustrated in FIG. 4A, a dynamic key derivation module 404 of participant system 142 may perform operations that dynamically and recursively derive a local public cryptographic key 406 that, when applied to sensitive customer or business data 402, generated encrypted data capable of decryption and processing by the one or more additional computing systems, such as, but not limited to, participant system 162. In some examples, dynamic key derivation module 404 may perform operations that access ledger data 166, e.g., as maintained locally within data repository 164, and extract master public cryptographic key 320 from one or more ledger blocks of the permissioned distributed ledger described herein. For instance, and as described herein, master public cryptographic key 320 may be associated with the corresponding organizational unit, organizational sub-unit, or permissioning group of the enterprise, such as the retail banking unit of the hierarchically organized financial institution, and peer system 122 may generate master public cryptographic key 320 using any of the exemplary processes described herein.

Further, dynamic key derivation module 404 may also perform operations that access indexed permissioning data 304 within one or more ledger blocks of ledger data 166, and extract index value 407 from indexed permissioning data 304. In some instances, and as described herein, extracted index value 407 may be associated with, and may represent, a data access permission assigned to participant system 162 and additionally, or alternatively, with a permissioning group that includes participant system 162. For example, extracted index value 407 may include character string "2344" of FIG. 3B, which corresponds to index value 314 associated with participant system 162, and additionally, or alternatively, may include character string "7279" of FIG. 3B, which corresponds to index value 315 associated with permissioning group 280 that includes participant system 162.

Referring back to FIG. 4A, dynamic key derivation module 404 may generate local public cryptographic key 406 based on an application of one or more one or more elliptic-curve key derivation algorithms to master public cryptographic key 320 and to extracted index value 407. For instance, local public cryptographic key 406 may correspond to a "child" public cryptographic key recursively derived from a "parent" public cryptographic key, i.e., master public cryptographic key 320, and examples of the elliptic-curve key derivation algorithms include, but are not limited to, one or more child key derivation functions consistent with Bitcoin Improvement Proposal (BIP) 0032. The disclosed embodiments are, however, not limited to these examples of elliptic-curve key derivation algorithms, and in other instances, dynamic key derivation module 404 may apply any additional or alternate elliptic-curve key derivation algorithm, or any other key generation algorithm, that would be appropriate to, and consistent with, a structure or composition of master cryptographic data 318 and sensitive customer of business data 402.

In some instances, dynamic key derivation module 404 may perform operations that store, on a temporary basis, local public cryptographic key 406 within a corresponding portion of local cryptographic data store 148, e.g., as maintained within data repository 144, and may provide local public cryptographic key 406 as an input to encryption module 408. Encryption module 408 may also access, or receive as an input, the generated or modified elements of customer or business data 402, and may perform operations that encrypt the generated or modified elements of customer or business data 402 with local public cryptographic key 406. In some instances, encryption module 408 may perform operations that store encrypted data 410 within a corresponding portion of one or more tangible, non-transitory memories, e.g., within data repository 144, and may provide encrypted data 410 as an input to a recordation module 412 of participant system 142.

Recordation module 412 may perform operations that package all, or a portion of encrypted data 410 into a request, e.g., recordation request 414, to immutably record the elements of encrypted data 410 within one or more ledger blocks of a cryptographically secure distributed ledger data structure, such as the permissioned distributed ledger described herein. In some instances, recordation module 412 may also package index value 407 into a corresponding portion of recordation request 414, along with local public cryptographic key 406 and additionally, or alternatively, system data 416 that uniquely identifies participant system 142. For example, system data 416 may include, but is not limited to, a unique Internet Protocol (IP) address or a unique media access control (MAC) address assigned to participant system 142.

Further, recordation module 412 may provide recordation request 414 as an input to a routing module 418 of participant system 142, which may obtain a unique network address of each peer system operating within environment 100, such as an IP address of peer system 122, and perform operations that cause participant system 142 to broadcast recordation request 414 across network 121 to each of peer systems 120, including peer system 122, e.g., using any appropriate communications protocol.

Peer system 122 (and each additional or alternate one of node systems operating within environment 100) may receive recordation request 414 through a corresponding programmatic interface, such as an application programming interface (API). By way of example, peer system 122 may perform any of the exemplary, consensus-based processes described herein that, in conjunction with the other peer systems operating within environment 100, generate a new ledger block 420 that includes encrypted data 410 (and in some instances, index value 407 and additionally, or alternatively local public cryptographic key 406 or system data 416), and append to new ledger block 420 to a prior version of the permissioned distributed ledger, which generates a latest, longest version of the permissioned distributed ledger (e.g., an updated permissioned distributed ledger 422). As described herein, the additional operations may be established through a distributed consensus among the other peer systems operating within environment 100, and may include, but are not limited to, the calculation of an appropriate proof-of-work or proof-of-stake by peer system 122 prior to the other peer systems.

Peer system 122 may also broadcast updated permissioned distributed ledger 422, which represents the latest, longest version of the permissioned distributed ledger, to the other peer systems operating within environment 100 and additionally or alternatively, to each of the network-connected systems that participate in the distributed-ledger network, such as participant system 162.

In other examples, encryption module 408 may also provide encrypted data 410 as an input to a provisioning module 424 of participant system 142, which may package encrypted data 410 into a corresponding portion of provisioning data 425, along with all or a portion of system data 416. Provisioning module 424 may provide provisioning data 425 to routing module 418, which may perform any of the exemplary processes described herein that cause participant system 142 to transmit provisioning data 425 across network 121 to a unique network address assigned to participant system 162, e.g., through a secure programmatic interface, and additionally, or alternatively, to transmit provisioning data 425 across network 121 to a unique network address assigned to one or more additional computing systems 426, such as those associated with an external data repository or cloud-based repository, e.g., through a secure programmatic interface.

Further, as illustrated in FIG. 4A, and in response to the encryption of the one or more elements sensitive customer or business data 402, a key management module 428 of participant system 142 may access local public cryptographic key 406 within the corresponding portion of local cryptographic data store 148, e.g., as maintained within data repository 144. In some examples, key management module 428 may perform operations that delete local public cryptographic key 406 from the corresponding portion of local cryptographic data store 148 and discard local public cryptographic key 406.

As described herein, peer system 122, in conjunction with the other peer systems operating within environment 100, may perform any of the exemplary processes described herein to immutably record encrypted data 410 within new ledger block 420 of updated permissioned distributed ledger 422, and to broadcast updated permissioned distributed ledger 422 to each of the network-connected devices or systems that participate in the distributed-ledger network, such as, but not limited to, participant system 162. In some examples, participant system 162 may access encrypted data 410, e.g., within ledger block 420, and may perform any of the exemplary processes described herein to dynamically and recursively derive a local private cryptographic key capable of decrypting all or a portion of the encrypted data 410 in accordance with a data access permissioned assigned to participant system 142 within a hierarchically organized enterprise, and to discard the derived local private cryptographic key a successful decryption of the elements of encrypted data.

Figure 4B:
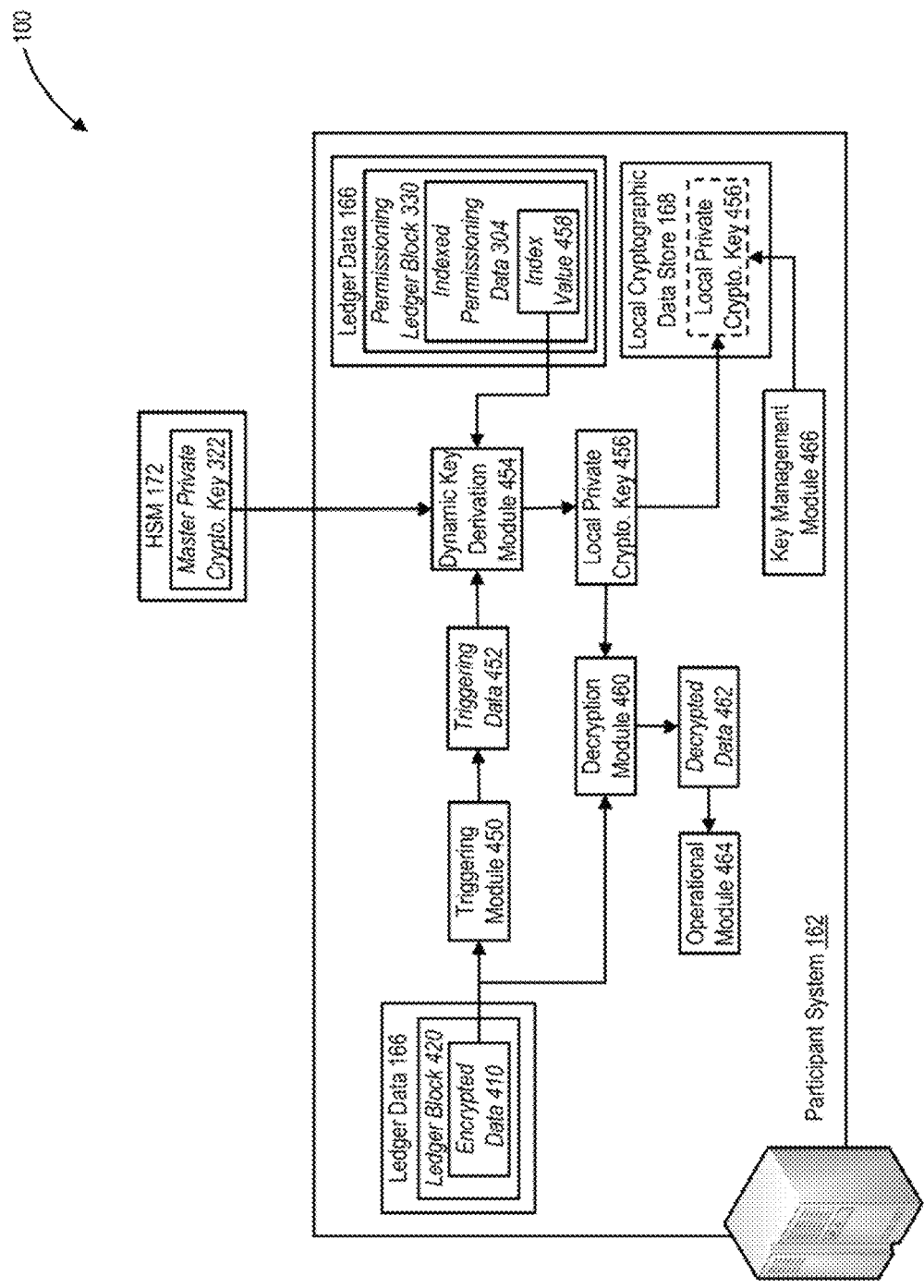

Referring to FIG. 4B, a triggering module 450 of participant system 162 may access ledger data 166, which maintains a local copy of all, or a portion, of updated permissioned distributed ledger 422, and detect a presence of encrypted data 410 within new ledger block 420. In some instances, and as described herein, participant system 142 may be operate within the digital payment group of a hierarchically organized financial institution, and may be configured to further process portions of encrypted data 410, such as for purposes of audit, for reconciliation or dispute resolution, for archiving, etc. Based on the detected presence of encrypted data 410, triggering module 450 may generate and provide triggering data 452 as an input to a dynamic key derivation module 454 of participant system 162.

In some examples, dynamic key derivation module 454 may perform operations that dynamically and recursively, derive a local private cryptographic key 456 based on a "master" public cryptographic key 322, which is associated with an organization unit, sub-unit, or permissioning group of the hierarchically organized enterprise that includes participant system 162, and on one or more data access permissions assigned to participant system 162 within hierarchically organized enterprise. For instance, and as described herein, participant system may operate within the digital payments group of a hierarchically organized financial institution, and that digital payments group may be further associated with a payments department that operates within a retail banking unit of the hierarchically organized financial institution. Further, and by way of example, master private cryptographic key 322 can be associated with the retail banking unit of the financial institution, and may be derived and distributed securely by peer system 122 to each network-connected system or device operating within the retail banking unit, e.g., using any of the exemplary processes described herein.

For instance, participant system 162 may include, or may be communicatively coupled through a corresponding interface to, one or more secure memory devices, such as hardware security module (HSM) 172. In some examples, dynamic key derivation module 454 may perform operations that access HSM 172, and extract master private cryptographic key 322, e.g., as associated with the retail banking unit that includes participant system 162.

Further, dynamic key derivation module 454 may also access indexed permissioning data 304 within the one or more ledger blocks maintained by ledger data 166 (e.g., as further maintained within data repository 164), and extract an index value 458 that identifies participant system 162 within the hierarchically structured elements of indexed permissioning data 304. For example, and as described above in reference to FIG. 3B, index value 458 may include character string "2344," which corresponds to index value 314 associated with participant system 162 within indexed permissioning data 304. Additionally, or alternatively, and in reference to FIG. 3B, index value 458 may include character string "7279," which corresponds to index value 315 associated with permissioning group 280 that includes participant system 162.

In some examples, dynamic key derivation module 454 may derive local private cryptographic key 456 based an application of one or more elliptic-curve key derivation algorithms to master private cryptographic key 322 and to extracted index value 458. For instance, local private cryptographic key 456 may correspond to a "child" private cryptographic key recursively derived from a "parent" private cryptographic key, i.e., master private cryptographic key 322, and examples of the elliptic-curve key derivation algorithms include, but are not limited to, one or more child key derivation functions consistent with Bitcoin Improvement Proposal (BIP) 0032. The disclosed embodiments are, however, not limited to these examples of elliptic-curve key derivation algorithms, and in other instances, dynamic key derivation module 454 may apply any additional or alternate elliptic-curve key derivation algorithm, or any other key generation algorithm, that would be appropriate to, and consistent with, a structure or composition of master private cryptographic key 322 and encrypted data 410.

In some instances, dynamic key derivation module 454 may perform operations that store, on a temporary basis, local private cryptographic key 456 within a corresponding portion of local cryptographic data store 168, e.g., as maintained within data repository 164, and may provide local private cryptographic key 456 as an input to decryption module 460. Decryption module 460 may also access the one or more ledger blocks maintained within ledger data 166 (e.g., within data repository 164), and extract one or more elements of encrypted data 410. Additionally, or alternatively (not illustrated in FIG. 4B), triggering module 450 may also perform operations that provide all or a portion of the elements of encrypted data 410 as an input to decryption module 460.

Decryption module 460 may receive local private cryptographic key 456 and encrypted data 410, and may perform operations that decrypt all or a portion of encrypted data 410 using local private cryptographic key 456, e.g., to generate elements of decrypted data 462. As described herein, decrypted data 462 may include one or more elements of sensitive customer data (e.g., payment credentials, customer credentials or data, etc.) or sensitive business data (e.g., internal projections, budgetary information, etc.), and decryption module 460 may provide all or a portion of decrypted data 462 as an input to an operational module 464 of participant system 162. In some instances, operational module 464 may access one or more elements of decrypted data 462, and perform any of the additional process described herein based on the accessed elements of decrypted data 462, such as but not limited to, auditing or reconciliation processes, processes that facilitate dispute resolution, archiving processes, etc.

Further, as illustrated in FIG. 4B, and in response to the decryption of encrypted data 410, a key management module 464 of participant system 162 may access local private cryptographic key 456 within the corresponding portion of local cryptographic data store 168, e.g., as maintained within data repository 164. In some examples, key management module 464 may perform operations that delete local private cryptographic key 456 from the corresponding portion of local cryptographic data store 148 and discard local private cryptographic key 456.

As described herein, certain of the disclosed exemplary embodiments enable a network-connected computing system, such as participant systems 142 or 162, to dynamically recover a "local" public cryptographic key suitable to encrypt sensitive data in accordance with a data access permission assigned to particular organizational unit or sub-unit of a hierarchically organized enterprise, or assigned to a particular permissioning group within that enterprise, based on an accessible "master" public cryptographic key associated with the particular organizational unit, organization sub-unit, or permissioning group. Similarly, certain of the disclosed exemplary embodiments enable participant systems 142 or 162, to dynamically recover a "local" private cryptographic key suitable to decrypt data in accordance with a data access permission assigned to particular organizational unit or sub-unit of a hierarchically organized enterprise, or assigned to a particular permissioning group within that enterprise, based on a securely provisioned "master" private cryptographic key associated with the particular organizational unit, organization sub-unit, or permissioning group.

By dynamically recovering, and subsequently discarding, these permission-specific local public and private cryptographic keys for each discrete encryption or decryption operation, certain of these disclosed embodiments can eliminate any need for participant systems 142 and 162, and other network-connected systems operating within environment 100, to maintain multiple pairs of asymmetric cryptographic keys for each data access permission assigned within hierarchically organization.

In some instances, the resulting simplification of the key management processes performed by network-connected devices and systems operating within environment 100 can reduce a risk of compromise, as fewer pairs of asymmetric cryptographic keys are distributed to these devices and systems, e.g., via secure HSMs, etc. Further, as certain of the disclosed embodiments derive each of the master public cryptographic keys (e.g., as associated with an organization unit, or a sub-unit, of the enterprise) from a single, master organizational cryptographic key maintained locally and securely by one or more of the peer systems operating within environment 100, such as peer system 122, any comprise of a corresponding one of the master public cryptographic keys (e.g., associated with a corresponding organizational unit or sub-unit) would at most comprise the asymmetric cryptographic keys maintained by devices and systems operating within an organizational sub-tree associated with that comprised master public cryptographic key, e.g., organizational sub-tree 210 associated with internal node 204 of FIG. 2B.

As described herein, peer system 122 can perform operations that identify an index associated with the comprised cryptographic key (e.g., the index value of a corresponding organizational unit, organizational sub-unit, or permissioning group within indexed permissioned data 304, as maintained within permissioning data store 126 of FIG. 1) and modify a portion of the revocation list associated with the master organizational cryptographic key (e.g., as maintained within cryptographic data store 128 of FIG. 1) to revoke not only the identified index associated with the corresponding organizational unit, organizational sub-unit, or permissioning group (e.g., associated with an internal node of hierarchical data structure 230), but also the indices of all organization children associated with that identified index (e.g., those internal nodes within hierarchical data structure 230 that are children of the organizational unit or sub-unit, or that are included within the permissioning group).

In response to the revocation of the index value within the maintained revocation list, peer system 122 may perform operations that compute a new index value for the corresponding organizational unit, organizational sub-unit, or permissioning group, and may update a portion of indexed permissioning data 304 (e.g., as maintained within permissioning data store 126 of FIG. 1) to reflect the newly computed index value for the corresponding organizational unit, sub-unit, or permissioning group (e.g., for internal node 204, which corresponds to the retail banking unit of the financial institution, or for permissioning group 280, etc.). Peer system 122 may then perform any of the exemplary processes described herein to derive an additional pair of master asymmetric cryptographic keys for the organizational unit, sub-unit, or permissioning group, and to distribute securely corresponding ones of the master public cryptographic key and the master private cryptographic key, and the newly updated portions of indexed permissioning data 304, to network-connected devices and systems operating within the corresponding organizational unit, organizational sub-unit, or permissioning group. In some examples, by immutably recording the newly derived master public cryptographic key and the updated indexed permissioning data 304 within ledger blocks of the permissioned distributed ledger (e.g., using any of the processes described herein), certain of the disclosed exemplary embodiments can generate an immutable, time-stamped record characterizing the derivation, comprise, and replacement of the cryptographic keys within the hierarchically organized enterprise.

In some examples, as described herein, participant system 142 or 162 may perform operations that encrypt elements of customer or business data based on a dynamically derived, local public cryptographic key associated with an organizational unit, an organizational sub-unit of that organizational unit, or a permissioning group within that organizational unit. Further, and as described herein, participant system 142 or 162 may perform additional operations that decrypt elements of encrypted customer or business data based on a dynamically derived, local public cryptographic key associated with an organizational unit, an organizational sub-unit of that organizational unit, or a permissioning group within that organizational unit. Certain of the disclosed exemplary embodiments, which derive the local public and private cryptographic keys recursively based on corresponding master public and private cryptographic keys associated with the organizational unit of the hierarchically organized enterprise, may facilitate a secure and permissioned exchange of data between the network-connected systems and devices operating within the organizational unit, such as the retail banking unit of the financial institution described herein.

In other instances, one or more of the disclosed exemplary embodiments may facilitate a secure and permissioned exchange of data between one or more organizational units of the hierarchically organized enterprise, e.g., between a network-connected system operating within a first organizational unit (e.g., participant system 142 operating within the retail banking unit of the financial institution), and an additional network-connected device operating within a second organizational unit (e.g., participant system 162 operating within the branch banking unit of the financial institution). For example, one or more of peer system 120, such as peer system 122, may perform any of the exemplary processes described herein to generate indexed permissioning data characterizing the second organizational sub-unit, and any organizational sub-units associated with the second organizational unit, and to derive recursively a pair of master asymmetric cryptographic keys for that second organizational unit. Further, peer system 122 may perform any of the exemplary processes described to immutably record the indexed permissioning data and the master public cryptographic key associated with the second organizational unit within one or more ledger blocks of the permissioned distributed ledger, and to securely provision the master private cryptographic key associated with the second organizational unit to one or more network-connected devices or systems operating within the first organizational unit, such as participant system 142.

Participant system 142 may perform any of the exemplary processes described herein to recursively derive a local public cryptographic key based on the master public cryptographic key for the second organizational unit and an index value corresponding to a permissioning data element associated with one or more devices or systems within the second organizational unit. Further, participant system 162, which operated within the second organizational unit, may perform any of the exemplary processes described herein to generate a corresponding local private cryptographic key that facilitates a secure and permissioned decryption of the data encrypted by participant system 142, which operates within the first organizational unit.

In other examples, all or a portion of the master cryptographic data associated with the hierarchically organized enterprise, e.g., as maintained within master cryptographic data 318 by peer system 122, may be comprised, e.g., by a hardware failure that corrupts the corresponding master cryptographic key or based on a breach by one or more malicious actors. In some instances, and to account for a potential loss or compromise of master cryptographic data 318, peer system 122 (and additional ones of peer systems 120 operating within environment 100) may maintain or may access an additional hierarchical tree of master asymmetric cryptographic keys pairs, e.g., as derived recursively from master key maintained by an additional one of peer system 120 or other network-connected systems operating within environment 100. Upon detection of the comprised or lost elements of master cryptographic data 318, peer system 122 may perform any of the operations described herein to recover and re-derive the pairs of master asymmetric cryptographic keys based on corresponding portions of the additional hierarchical tree.

In other instances, the master cryptographic key of associated with the hierarchically organized enterprise (e.g., as maintained within master cryptographic data 318) may itself be derived from an additional master cryptographic key, e.g., a "super" master key maintained in a secure data repository, such as hardware security module (HSM). Upon detection of the comprised or lost elements of master cryptographic data 318, peer system 122 may perform any of the operations described herein to re-derive the pairs of master asymmetric cryptographic keys based on super master cryptographic key.

Figure 5:
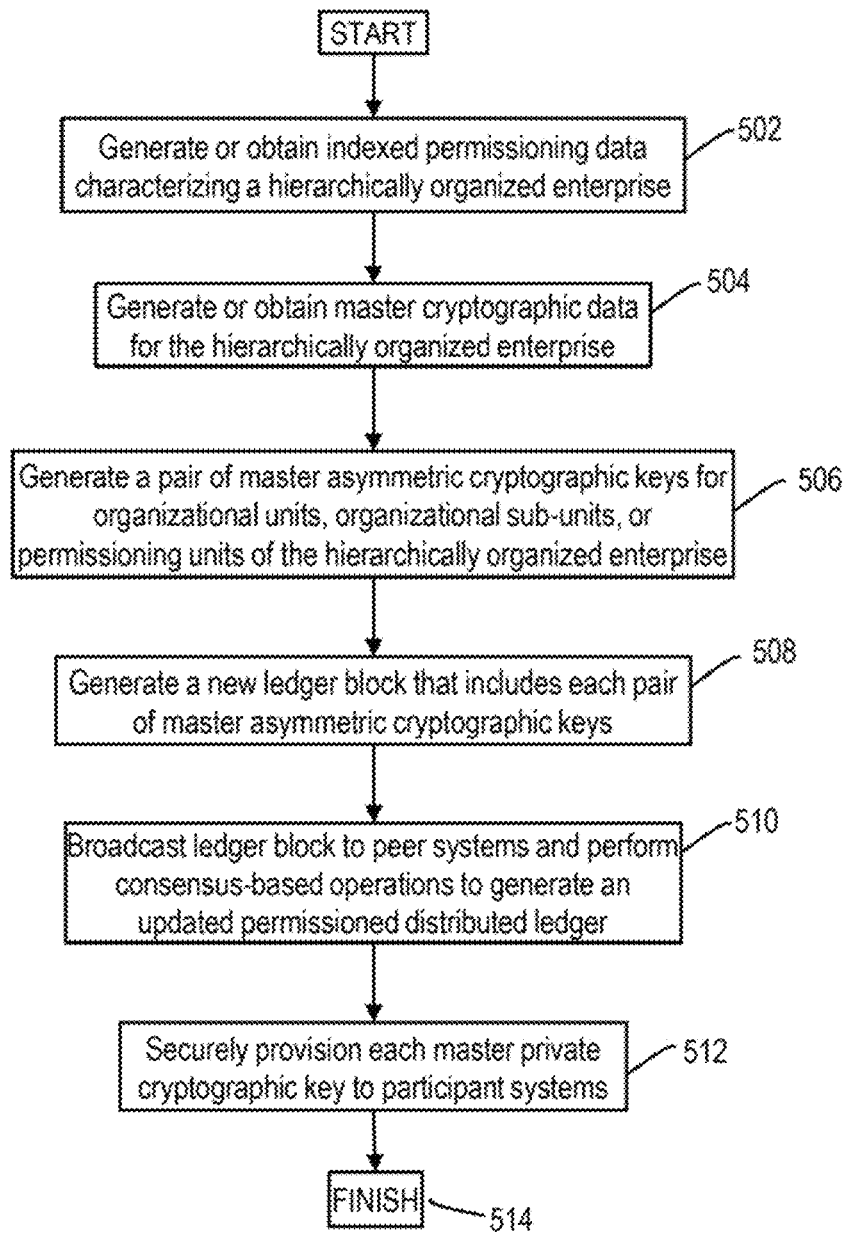
FIG. 5 is a flowchart of an exemplary process for dynamically generating master asymmetric cryptographic keys, consistent with the disclosed embodiments.

FIG. 5 is a flowchart of an exemplary process 500 for dynamically generating asymmetric cryptographic keys based on hierarchically structured indexing data. In some examples, a network-connected computing system, such as peer system 122 of FIG. 1, may perform one or more of the exemplary steps of process 500, which, among other things, dynamically and recursively derive one or more pairs of asymmetric cryptographic keys based on a master cryptographic key and on indexed permissioning data characterizing a hierarchical structure of an enterprise, Referring to FIG. 5, peer system 122 may perform any of the exemplary processes described herein to generate, or obtain, indexed permissioning data characterizing a hierarchically organized enterprise (e.g., in step 502). By way of example, and as described herein, each of the elements of indexed permissioning data identifies and characterizes an organizational unit, an organizational sub-unit, or a permissioning group within a hierarchical structure of the enterprise and further, one or more network-connected devices or system associated with and operating within corresponding ones of the organizational units, the organizational sub-units, or the permissioning groups. In some instances, the elements of indexed permissioning data may be formatted in accordance with one or more appropriate directory or application protocols, such as, but not limited to, an Active Directory™ protocol or a lightweight directory access protocol (LDAP™), and hierarchical data structure 230 may maintain, for each of the organizational units, organizational sub-units, and associated devices or systems, a value of a unique identifier, values of one or more attributes, and the corresponding elements of permissioning data.

Further, and as described herein, the elements of the indexed permissioning data may also maintain, for each of the each of the organizational units, organizational sub-units, and associated devices or systems, an index value that includes an alphanumeric character string of predetermined format and composition. In some instances, peer system 122 may generate the index values based on an application of one or more hash functions to all, or a portion, of corresponding identifiers of the organizational units, organizational sub-units, and associated devices or systems. Examples of these hash functions include, but are not limited to, one or more functions consistent with the secured hash algorithm (SHA) standards, such as a SHA-3 algorithm.

Referring back to FIG. 5, peer system 122 may also perform any of the exemplary processes described herein to obtain, or generate, master cryptographic data associated with the hierarchically organized enterprise (e.g., in step 504). By way of example, the master cryptographic data may include, among other things, a master cryptographic for the hierarchically organized enterprise, e.g., corresponding to root node 202 of hierarchical structure 200 of FIG. 2A, a chain code corresponding to that master cryptographic key, and a revocation list associated with the master cryptographic key (e.g., as based on index values hierarchically arranged within indexed permissioning data 304).

Peer system 122 may perform any of the exemplary processes described herein to derive a master asymmetric cryptographic key pair, which includes a corresponding master public cryptographic key and a corresponding master private cryptographic key, for one or more of the organizational units, organization sub-units, or permission groups of the enterprise (e.g., in step 506). In some instances, and to generate each of the master pairs of asymmetric cryptographic keys for the organizational units or sub-units, peer system 122 may apply one or more elliptic-curve key derivation algorithms to the master organizational cryptographic key (e.g., as extracted from the master cryptographic data) and an index value corresponding to each of the respective organizational units, sub-units, or permissioning groups (e.g., as extracted from the indexed permissioning data). Further, in step 506, peer system 122 may also perform any of the exemplary processes described herein that generate a revocation list corresponding to the chain code for each of the generated pairs of master asymmetric cryptographic keys, e.g., for the corresponding master private cryptographic keys within each pair.

Peer system 122 may also perform any of the exemplary processes described herein to generate a new public key ledger block of a permissioned distributed ledger that includes, among other things, the master public cryptographic key associated with each of the generated master pairs of asymmetric cryptographic keys, and to generate a new permissioning ledger block of the permissioned distributed ledger that includes, among other things, all or a portion of the indexed permissioning data associated with the master public cryptographic keys (e.g., in step 508). As described herein, the newly generated public key ledger block and the newly generated permissioning data block may each include a corresponding hash value of the block contents (e.g., the master public cryptographic keys or the indexed permission data), along with a corresponding public cryptographic key of peer system 122.

In step 510, peer system 122 may broadcast the new public key block and the new permissioning ledger block across network 121 to each of the other peer systems operating within environment 100, and may perform any of the exemplary consensus-based processes described herein to append the new public key ledger block and the new permissioning ledger block to a prior version of the permissioned distributed ledger, which generates a latest, longest version of the permissioned distributed ledger. Further, in step 510, peer system 122 may also broadcast the updated permissioned distributed ledger 336, which represents the latest, longest version of the permissioned distributed ledger, to the other peer systems operating within environment 100 and additionally or alternatively, to each of the network-connected systems that participate in the distributed-ledger network, such as participant systems 142 and 162.

Further, peer system 122 may also perform operations that provision the master public cryptographic key associated with each of the generated master pairs of asymmetric cryptographic keys, the chain codes, and the revocation lists to corresponding ones of the network-connected devices and systems associated with the enterprise, and operating within environment 100, through a secure, out-of-band communications channel (e.g., in step 512). By way of example, peer system 122 may provision the master private cryptographic keys (and in some instances, the generated chain code and/or the generated revocation list) to one or more secure memory devices communicatively coupled to peer system 122 through a corresponding hardware-based interface. Examples of the one or more secure memory devices include, but are not limited to, one or more hardware security modules (HSMs), such as HSM 152 of participant system 142 and HSM 172 of participant system 162 described herein. Exemplary process 500 is then complete in step 514.

Figure 6:
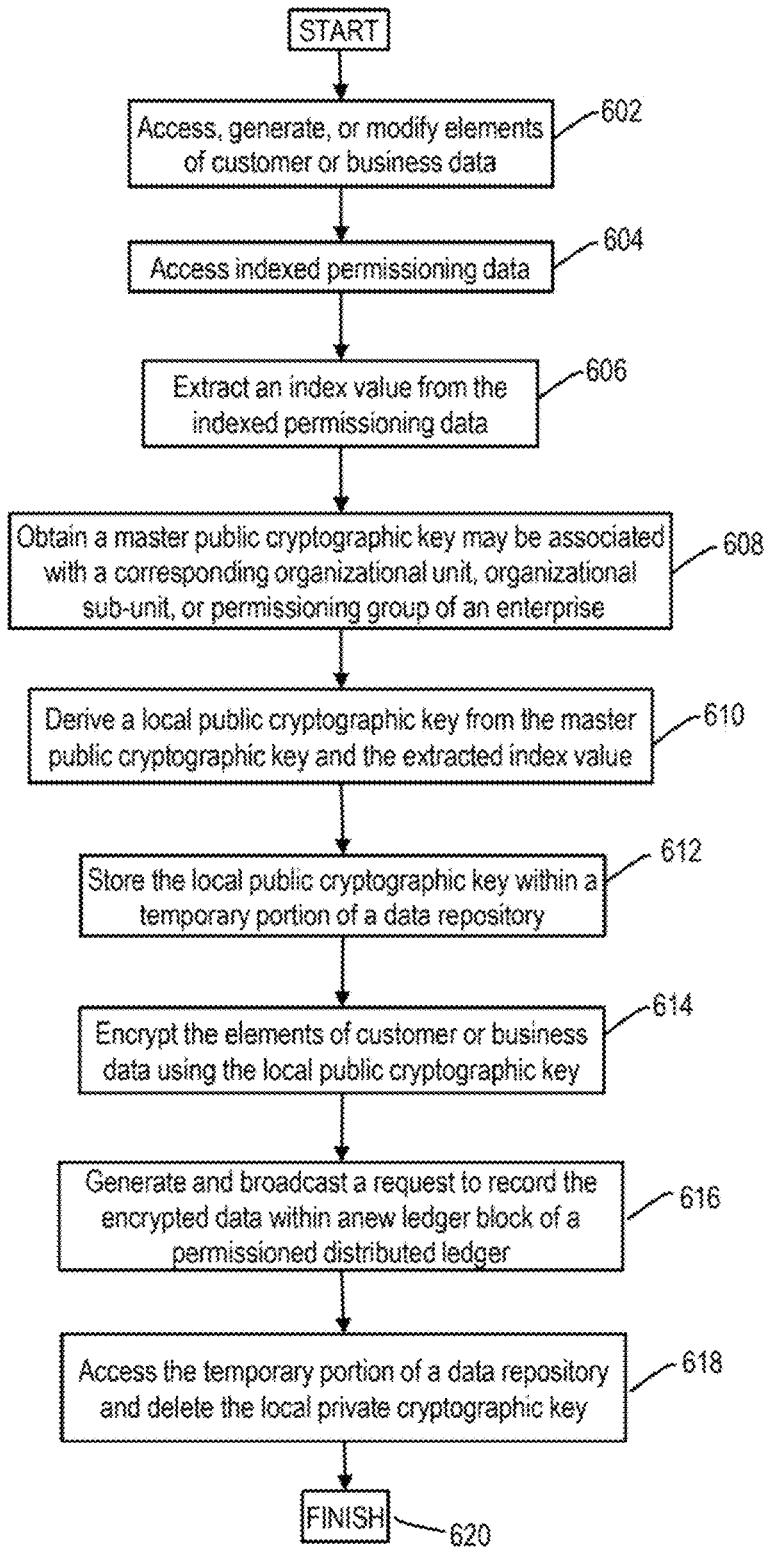
FIG. 6 is a flowchart of an exemplary process for encrypting data using dynamically generated local public cryptographic keys, consistent with the disclosed embodiments.

FIG. 6 is a flowchart of an exemplary process 600 for encrypting data using dynamically generated, and discarded, local public cryptographic keys. In some examples, a network-connected computing system associated with a hierarchically organized enterprise, such as participant system 142 or participant system 162, may perform one or more of the exemplary steps of process 500, which, among other things, dynamically and recursively derive a local public cryptographic key associated with a data access permission within organizational unit, sub-unit, or permissioning group of the enterprise based on a master public cryptographic key for that organizational unit, sub-unit, or permissioning group maintained within a distributed ledger data structure, that encrypt the data using the local public cryptographic key, and that subsequently purge the local public cryptographic key from a locally accessible memory.

Referring to FIG. 6, participant system 142 or 162, may perform operations that may generate new elements of sensitive customer data, or may modify existing elements of sensitive customer data, associated with a corresponding organizational unit, organizational sub-unit, or a permissioning group within a hierarchically organized enterprise (e.g., in step 602). For instance, the generated or modified elements of customer or business data may require additional processing by one or more additional computing systems operating within various organizational units, sub-units, or permissioning groups within the enterprise, and due its sensitive or confidential nature, the customer or business data may require encryption prior to recordation within a permissioned distributed ledger accessible across the enterprise.

In some instances, participant system 142 or 162 may perform any of the exemplary process described herein to access indexed permissioning data characterizing a hierarchically organized enterprise, such as the financial institution described herein (e.g., in step 604). For instance, participant system 142 or 162 may perform operations that access one or more ledger blocks of a locally maintained distributed ledger data structure, such as the permissioned distributed ledger described herein, and extract all of a portion of the indexed permissioning data from the accessed ledger blocks. In other instances, participant system 142 or 162 may maintain the indexed permissioning data within a tangible, non-transitory memory (e.g., within local permissioning data stores 150 or 170 of FIG. 1), and my extract all or a portion of the indexed permissioning data from the tangible, non-transitory memory.

By way of example, and as described herein, each of the elements of indexed permissioning data identifies and characterizes an organizational unit, an organizational sub-unit, or a permissioning group within a hierarchical structure of the enterprise and further, one or more network-connected devices or system associated with and operating within corresponding ones of the organizational units, the organizational sub-units, or the permissioning groups. In some instances, the elements of indexed permissioning data may be formatted in accordance with one or more appropriate directory or application protocols, such as, but not limited to, an Active Directory™ protocol or a lightweight directory access protocol (LDAP™), and the indexed permissioning data may maintain, for each of the organizational units, organizational sub-units, and associated devices or systems, a value of a unique identifier, values of one or more attributes, and the corresponding elements of permissioning data. Further, and as described herein, the elements of the indexed permissioning data may also maintain, for each of the each of the organizational units, organizational sub-units, and associated devices or systems, an index value that includes an alphanumeric character string of predetermined format and composition.

Participant system 142 or 162 may also perform any of the exemplary processes described herein to extract, from the indexed permissioning data, an index value from the indexed permissioning data that corresponds to a data access permission associated with the generated or modified customer or business data (e.g., in step 606). In some instances, and as described herein, the extracted index value ay be associated with, and may represent, a data access permission assigned to one or more network-connected devices or systems within the enterprise expected to access, modify, or process the customer or business data, and additionally, or alternatively, with to permissioning group that these network-connected devices or systems.

In further instances, participant system 142 or 162 may also perform operations that obtain a master public cryptographic key may be associated with corresponding organizational unit, organizational sub-unit, or permissioning group of the enterprise that includes participant system 142 or 162 (e.g., in step 608). For example, in step 608, participant system 142 or 162 perform operations that access the one or more ledger blocks of the locally maintained distributed ledger data structure, such as the permissioned distributed ledger described herein, and extract the master public cryptographic key from the one or more accessed ledger blocks. In other instances, participant system 142 or 162 may extract the master public cryptographic key from one or more tangible, non-transitory memories, e.g., from portions of local cryptographic data store 148 or 168 of FIG. 1.

Participant system 142 or 162 may perform any of the exemplary processes described herein to dynamically and recursively derive a local public cryptographic key that, when applied to sensitive the customer or business data, generates encrypted data capable of decryption and processing by the one or more additional network-connected devices or systems within the hierarchically organized enterprise that are assigned the corresponding data access permission (e.g., in step 610). By way of example, and as described herein, participant system 142 or 162 may generate the local public cryptographic key based on an application of one or more one or more elliptic-curve key derivation algorithms to the master public cryptographic key and to the extracted index value.

For instance, the local public cryptographic key may correspond to a "child" public cryptographic key recursively derived from a "parent" public cryptographic key, i.e., the master public cryptographic key, and examples of the elliptic-curve key derivation algorithms include, but are not limited to, one or more child key derivation functions consistent with Bitcoin Improvement Proposal (BIP) 0032. The disclosed embodiments are, however, not limited to these examples of elliptic-curve key derivation algorithms, and in other instances, participant system 142 or 162 may apply any additional or alternate elliptic-curve key derivation algorithm, or any other key generation algorithm, that would be appropriate to, and consistent with, a structure or composition of the master public cryptographic key and customer or business data.

In some instances, participant system 142 or 162 may perform operations that store, on a temporary basis, the local public cryptographic key within a corresponding portion of the one or more tangible, non-transitory memories, e.g., within local cryptographic data store 148 or 168 (e.g., in step 612). Further, participant system 142 or 162 may perform any of the exemplary processes described herein to encrypt the generated or modified elements of sensitive customer or business data using the derived local public cryptographic key (e.g., in step 614).

Participant system 142 or 162 may also perform any of the exemplary processes described herein to generate a recordation request that includes, among other things, the elements of the encrypted customer or business data, and to broadcast the recordation request across network 121 to each of the peer systems operating within environment 100, including peer system 122 (e.g., in step 616). In some instances, the peer systems, including peer system 122, may perform any of the consensus-based operations described herein to immutably record the elements of the encrypted customer or business data within a corresponding ledger block of a cryptographically secure, distributed ledger data structure, such as the permissioned distributed ledger described herein. Additionally, or alternatively, participant system 142 or 162 may also perform any of the exemplary processes to transmit, across network 121 through a corresponding secure, programmatic interface, the elements of encrypted customer or business data to one or more network-connected devices or systems operating within the hierarchically organized enterprise, or to one or more external computing systems, such as those associated with an external data repository or a cloud-based storage (e.g., also in step 616).

In some example, participant system 142 or 162 may perform any of the exemplary processes that access the temporary storage location of the derived local public cryptographic key (e.g., within local cryptographic data store 148 or 168), and purge the derived local public cryptographic key from the temporary storage (e.g., in step 618). As described herein, the derived local public cryptographic key may be discarded, and exemplary process 600 is then complete in step 620.

Figure 7:
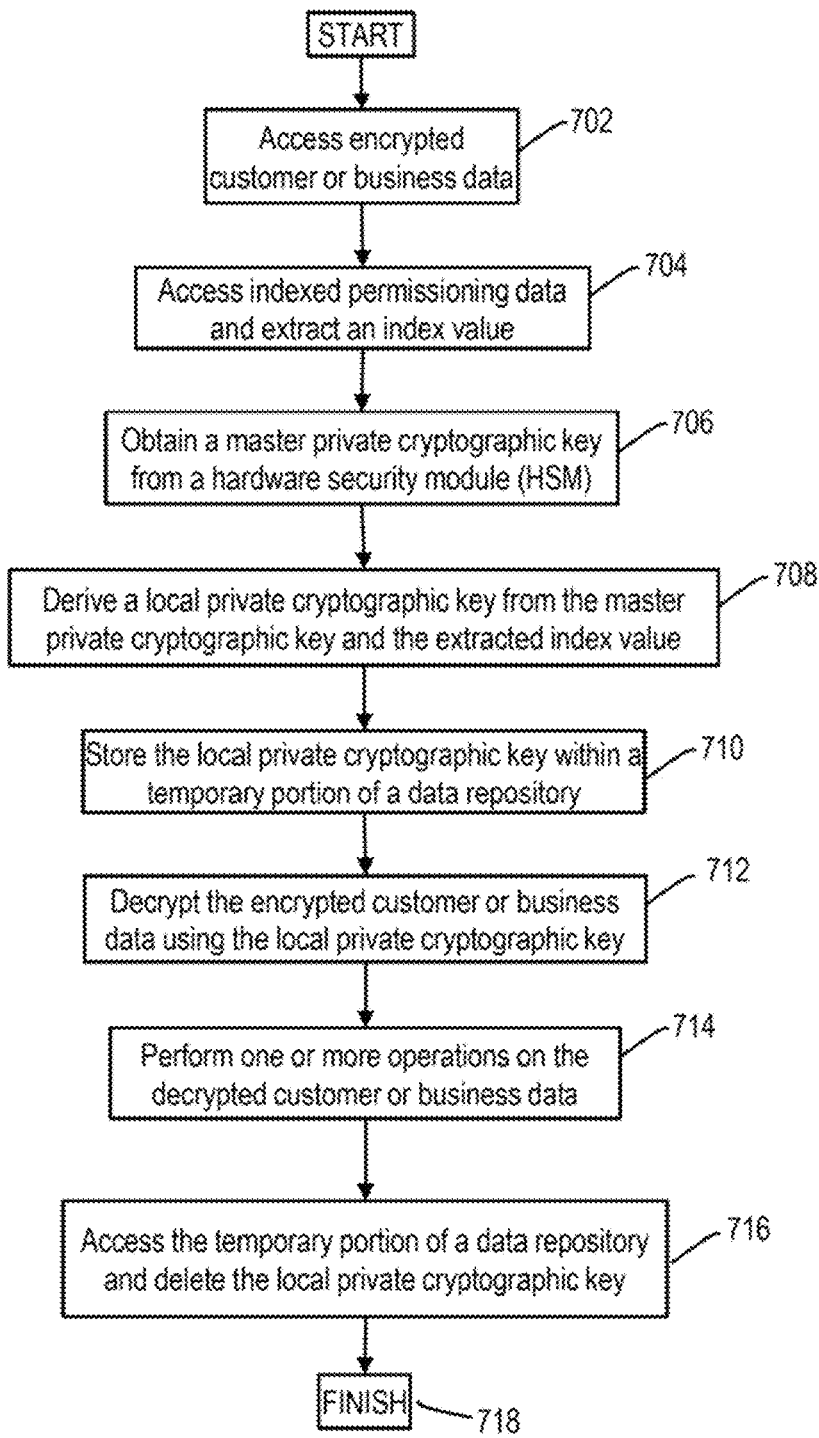
FIG. 7 is a flowchart of an exemplary process for decrypting elements of encrypted data using dynamically generated local private cryptographic keys, consistent with the disclosed embodiments.

FIG. 7 is a flowchart of an exemplary process 700 for decrypting elements of encrypted data using dynamically generated, and discarded, local private cryptographic keys. In some examples, a network-connected computing system associated with a hierarchically organized enterprise, such as participant system 142 or participant system 162, may perform one or more of the exemplary steps of process 500, which, among other things, dynamically and recursively derive a local private cryptographic key associated with a data access permission within organizational unit, sub-unit, or permissioning group of the enterprise based on a master private cryptographic key for that organizational unit, sub-unit, or permissioning group maintained within a distributed ledger data structure, and that decrypt the elements of encrypted data using the local private cryptographic key, and that subsequently purge the local private cryptographic key from a locally accessible memory.

Referring to FIG. 7, participant system 142 or 162 may perform operations that detect and access encrypted data within one or more ledger blocks of a locally maintained, and cryptographically secure distributed ledger data structure, such as the permissioned distributed ledger described herein (e.g., in step 702). Additionally, or alternatively, participant system 142 or 162 may also perform operations that access all, or a portion, of the encrypted data from a tangible, non-transitory memory, e.g., as maintained within data repositories 144 and 164. In some instances, and as described herein, participant system 142 or 162 may operate within a particular organizational unit, organizational sub-unit, or permissioning group of a hierarchically organized enterprise, and may be configured to further process portions of the encrypted data, such as for purposes of audit or reconciliation, for dispute resolution, for archiving, etc. Based on the detected presence of encrypted data 410, triggering module 450 may generate and provide triggering data 452 as an input to a dynamic key derivation module 454 of participant system 162.

In some instances, participant system 142 or 162 may perform any of the exemplary process described herein to access indexed permissioning data characterizing a hierarchically organized enterprise, such as the financial institution described herein (e.g., in step 704). For instance, participant system 142 or 162 may perform operations that access one or more ledger blocks of a locally maintained distributed ledger data structure, such as the permissioned distributed ledger described herein, and extract all of a portion of the indexed permissioning data from the accessed ledger blocks. In other instances, participant system 142 or 162 may maintain the indexed permissioning data within a tangible, non-transitory memory (e.g., within local permissioning data stores 150 or 170 of FIG. 1), and my extract all or a portion of the indexed permissioning data from the tangible, non-transitory memory.

By way of example, and as described herein, each of the elements of indexed permissioning data identifies and characterizes an organizational unit, an organizational sub-unit, or a permissioning group within a hierarchical structure of the enterprise and further, one or more network-connected devices or system associated with and operating within corresponding ones of the organizational units, the organizational sub-units, or the permissioning groups. In some instances, the elements of indexed permissioning data may be formatted in accordance with one or more appropriate directory or application protocols, such as, but not limited to, an Active Directory™ protocol or a lightweight directory access protocol (LDAP™), and the indexed permissioning data may maintain, for each of the organizational units, organizational sub-units, and associated devices or systems, a value of a unique identifier, values of one or more attributes, and the corresponding elements of permissioning data. Further, and as described herein, the elements of the indexed permissioning data may also maintain, for each of the each of the organizational units, organizational sub-units, and associated devices or systems, an index value that includes an alphanumeric character string of predetermined format and composition.

Participant system 142 or 162 may also perform any of the exemplary processes described herein to extract, from the indexed permissioning data, an index value from the indexed permissioning data that characterizes a data access permission associated with the generated or modified customer or business data (e.g., also in step 704). In some instances, and as described herein, the extracted index value may be associated with, and may represent, a data access permission assigned to participant system 142 or 162, and additionally, or alternatively, with to permissioning group that includes participant system 142 or 162.

In further instances, participant system 142 or 162 may also perform operations that obtain a master public cryptographic key may be associated with corresponding organizational unit, organizational sub-unit, or permissioning group of the enterprise that includes participant system 142 or 162 (e.g., in step 706). For example, in step 706, participant system 142 or 162 perform operations that access the one or more ledger blocks of the locally maintained distributed ledger data structure, such as the permissioned distributed ledger described herein, and extract the master public cryptographic key from the one or more accessed ledger blocks. In other instances, participant system 142 or 162 may extract the master public cryptographic key from one or more tangible, non-transitory memories, e.g., from portions of local cryptographic data store 148 or 168 of FIG. 1.

Further, participant system 142 or 162 may perform any of the exemplary processes described herein to dynamically and recursively derive a local private cryptographic key 456 based on the master public cryptographic key, which is associated with an organization unit, sub-unit, or permissioning group of the hierarchically organized enterprise that includes participant system 142 or 162, and on the extracted index value characterizing the one or more data access permissions assigned to participant system 142 or 162 within hierarchically organized enterprise (e.g., in step 708). In some examples, participant system 142 or 162 may derive the local public cryptographic key based an application of one or more elliptic-curve key derivation algorithms to the master public cryptographic key (e.g., as extracted from HSM 152 or 172) and to the extracted index value.

For instance, the local private cryptographic key may correspond to a "child" private cryptographic key recursively derived from a "parent" private cryptographic key, i.e., the master private cryptographic key, and examples of the elliptic-curve key derivation algorithms include, but are not limited to, one or more child key derivation functions consistent with Bitcoin Improvement Proposal (BIP) 0032. The disclosed embodiments are, however, not limited to these examples of elliptic-curve key derivation algorithms, and in other instances, participant system 142 or 162 may apply any additional or alternate elliptic-curve key derivation algorithm, or any other key generation algorithm, that would be appropriate to, and consistent with, a structure or composition of the master private cryptographic key and the elements of encrypted data.

In some instances, participant system 142 or 162 may perform operations that store, on a temporary basis, the local private cryptographic key within one or more tangible, non-transitory memories, e.g., within corresponding portion of local cryptographic data store 148 or 168 (e.g., in step 710). Further, participant system 142 or 162 may perform any of the exemplary processes described herein to decrypt all or a portion of the encrypted data using the local private cryptographic key, e.g., to generate elements of decrypted data (e.g., in step 712). As described herein, the elements of decrypted data may include one or more elements of sensitive customer data (e.g., payment credentials, customer credentials or data, etc.) or sensitive business data (e.g., internal projections, budgetary information, etc.), and in step 714, participant system 142 or 162 may perform or apply any of the processes to the elements of decrypted data, such as but not limited to, auditing or reconciliation processes, processes that facilitate dispute resolution, archiving processes, etc.

In some example, participant system 142 or 162 may perform any of the exemplary processes that access the temporary storage location of the derived local private cryptographic key (e.g., within local cryptographic data store 148 or 168), and purge the derived local private cryptographic key from the temporary storage (e.g., in step 716). As described herein, the derived local private cryptographic key may be discarded, and exemplary process 700 is then complete in step 718.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including, but not limited to, indexing module 302, dynamic key derivation module 316, block generation module 326, distributed consensus module 334, dynamic key derivation module 404, encryption module 408, recordation module 412, routing module 418, provisioning module 424, key management module 428, triggering module 450, dynamic key derivation module 454, decryption module 460, operational module 464, key management module 466, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
  a communications unit;
  a storage unit storing instructions; and
  at least one hardware processor coupled to the communications unit and the storage unit, the at least one processor being configured to execute the instructions to:
    extract, from a hierarchical data structure, an index value associated with a corresponding element of permissioning data, the hierarchical data structure being maintained within the storage unit, the element of permissioning data comprising an identifier associated with the apparatus, and the index value comprising a hash value representative of the identifier;
    access cryptographic data maintained within a first element of a distributed ledger, the cryptographic data comprising a first public cryptographic key associated with an organizational unit of the hierarchical data structure, the apparatus being associated with an organizational sub-unit of the hierarchical data structure, and the organization sub-unit being associated with the organizational unit;
    generate a second public cryptographic key based on the first public cryptographic key and the extracted index value, the second public key being associated with the organization sub-unit; and
    encrypt first data using the second public cryptographic key, the encrypted first data being associated with the corresponding element of permissioning data, and the second public cryptographic key being discarded in response to the encryption of the first data.

2. The apparatus of claim 1, wherein the at least one processor is further configured to generate and transmit, via the communications unit, a signal that includes the encrypted first data to a computing system, the signal comprising information causing the computing system to perform operations that record the encrypted first data within a second element of the distributed ledger.

3. The apparatus of claim 1, wherein the at least one processor is further configured to:
  access a second element of the distributed ledger, the second element comprising the hierarchical data structure; and
  extract the index value from the second element of the distributed ledger.

4. The apparatus of claim 1, wherein the at least one processor is further configured to:
  access second encrypted data maintained within a distributed ledger, the encrypted document data being associated with the element of permissioning data;
  obtain a first private cryptographic key associated with the hierarchical data structure;
  generate a second private cryptographic key based the first private cryptographic key and the extracted index value; and
  perform operations that decrypt the second encrypted data using the second private cryptographic key, the second private cryptographic key being discarded in response to the decryption of the encrypted first data.

5. The apparatus of claim 1, wherein the at least one processor is further configured to:
  receive, via the communications unit, a signal from a computing system, the signal comprising permissioning data that includes the hierarchical data structure;
  perform operations that store the permissioning data within a portion of the storage unit;
  load the element of permissioning data from the portion of the storage unit.

6. The apparatus of claim 1, wherein the element of permissioning data specifies at least one of (i) a first access permission associated with the apparatus or (ii) a access permission associated with one or more computing systems, the first access permission characterizing an ability of the apparatus of encrypt the first data, and the second access permission characterizing an ability of the one or more computing systems to access or decrypt the encrypted first data.

7. The apparatus of claim 1, wherein the at least one processor is further configured to:
  store the second public cryptographic key within a portion of the storage unit; and
  in response to the encryption of the data, access the portion of the storage unit and perform operations that delete the second public cryptographic key.

8. An apparatus, comprising:
  a communications unit;
  a storage unit storing instructions; and
  at least one hardware processor coupled to the communications unit and the storage unit, the at least one processor being configured to execute the instructions to:
    access encrypted data maintained within a distributed ledger, the encrypted data being associated with an element of permissioning data maintained within a hierarchical data structure, and the permissioning data element being characterized by a corresponding index value, the permissioning data element specifying an access permission associated with the apparatus, and the access permission characterizing an ability of the apparatus to decrypt the encrypted data;

obtain a first private cryptographic key associated with an organizational unit the hierarchical data structure, the apparatus being associated with an organizational sub-unit of the hierarchical data structure, and the organizational sub-unit being associated with the organizational unit;

generate a second private cryptographic key based on the first private cryptographic key and the corresponding index value, the second private cryptographic key being associated with the organizational sub-unit; and perform operations that decrypt the encrypted data using the second private cryptographic key, the second private cryptographic key being discarded in response to the decryption of the encrypted data.

9. The apparatus of claim 8, wherein the at least one processor is further configured to extract, from the hierarchical data structure, the index value associated with the element of permissioning data.

10. The apparatus of claim 9, wherein the at least one processor is further configured to:
access one or more elements of the distributed ledger that maintain the hierarchical data structure; and
extract the index value associated with the element of permissioning data from the one or more accessed elements of the distributed ledger.

11. The apparatus of claim 9, wherein the at least one processor is further configured to:
receive, via the communications unit, a signal from a computing system, the signal comprising permissioning data that includes the hierarchical data structure;
perform operations that store the permissioning data within a portion of the storage unit;
load the permissioning data from the storage unit and extract the index value from the hierarchical data structure.

12. The apparatus of claim 8, wherein the at least one processor is further configured to extract the first private cryptographic key from a hardware security module communicatively coupled to the apparatus.

13. An apparatus, comprising:
a communications unit;
a storage unit storing instructions; and
at least one hardware processor coupled to the communications unit and the storage unit, the at least one processor being configured to execute the instructions to:
obtain (i) a master cryptographic key associated with a first computing system and (ii) elements of permissioning data maintained within a hierarchical data structure, each of the permissioning data elements being associated with a corresponding one of a plurality of second computing systems and comprising an identifier associated with the corresponding one of the plurality of second computing systems;
generate index values representative of the permissioning data elements, each of the generated index values being indicative of a position of a corresponding one of the permissioning data elements within the hierarchical data structure and comprising a hash value representative of a corresponding identifier;
based on the obtained master cryptographic key, generate a first public cryptographic key associated with an organizational unit of the hierarchical data structure; and
perform operations that generate an element of a distributed ledger that includes the first public cryptographic key, the permissioning data elements, and the generated index values, and that append the generated element to the distributed ledger, the permissioning data elements and the generated index values being maintained within the hierarchical data structure;
wherein each of the plurality of second computing systems are associated with an organizational sub-unit of the hierarchical data structure associated with the organizational unit; and
further wherein at least one of the second computing systems is configured to generate a second public cryptographic key based on the first public cryptographic key and the index value maintained within a corresponding one of the permissioning data elements, the second public cryptographic key being associated with the corresponding one of the organizational sub-units, further wherein the at least one of the second computing systems encrypts data using the second public cryptographic key.

14. The apparatus of claim 13, wherein the first public cryptographic key is further associated with permissioning group of the hierarchical data structure.

15. The apparatus of claim 14, wherein the at least one processor is further configured to, based on the elements of permissioning data, select a subset of the second computing systems associated with the the permissioning group.

16. The apparatus of claim 15, wherein:
the at least one processor is further configured to generate and transmit, via the communications unit, a signal that includes the permissioning data elements and the generated index values to the selected subset of the second computing systems, the permissioning data elements and the generated index values being maintained within the hierarchical data structure; and
the distributed ledger is accessible to at least the selected subset of the second computing systems.

17. The apparatus of claim 15, wherein the at least one processor is further configured to:
based on the obtained master cryptographic key, generate a private cryptographic key associated with the hierarchical data structure; and
perform operations that provision the private cryptographic key to the selected subset of the second computing systems.

18. The apparatus of claim 17, wherein the at least one processor is further configured to perform operations that encode the private cryptographic key onto a hardware security module communicatively coupled to the apparatus, and that provision the hardware security module to a corresponding one of the second computing systems.

* * * * *